US010197297B2

(12) United States Patent
Daniels, II et al.

(10) Patent No.: US 10,197,297 B2
(45) Date of Patent: Feb. 5, 2019

(54) PASSIVE VENTILATION CONTROL SYSTEM

(76) Inventors: William B. Daniels, II, Santa Rosa, CA (US); Carolina O'Hagin, Sebastopol, CA (US)

( * ) Notice: Subject to any disclaimer, the term of this patent is extended or adjusted under 35 U.S.C. 154(b) by 2034 days.

(21) Appl. No.: 11/526,215

(22) Filed: Sep. 21, 2006

(65) Prior Publication Data

US 2007/0072541 A1 Mar. 29, 2007

Related U.S. Application Data

(60) Provisional application No. 60/721,673, filed on Sep. 23, 2005, provisional application No. 60/795,905, filed on Apr. 27, 2006.

(51) Int. Cl.
*F24F 7/02* (2006.01)
*F24F 11/00* (2018.01)
*E05F 15/60* (2015.01)
*F24F 11/30* (2018.01)
*F24F 7/00* (2006.01)
*E05F 15/71* (2015.01)
*F24F 110/10* (2018.01)
(Continued)

(52) U.S. Cl.
CPC .............. *F24F 7/02* (2013.01); *E05F 15/60* (2015.01); *F24F 11/0001* (2013.01); *F24F 11/30* (2018.01); *E05F 15/71* (2015.01); *E05Y 2201/43* (2013.01); *E05Y 2400/40* (2013.01); *E05Y 2400/42* (2013.01); *E05Y 2800/21* (2013.01); *E05Y 2800/67* (2013.01); *F24F 2007/004* (2013.01); *F24F 2110/10* (2018.01); *F24F 2110/20* (2018.01); *F24F 2110/50* (2018.01)

(58) Field of Classification Search
CPC ... F24F 7/02; F24F 11/30; E05F 15/60; E05F 15/71
USPC .......................................................... 454/365
See application file for complete search history.

(56) References Cited

U.S. PATENT DOCUMENTS 1,562,865 A 11/1925 Brown
1,764,343 A 6/1930 Petrelli
(Continued)

FOREIGN PATENT DOCUMENTS

EP 0103559 3/1984
EP 2745369 8/1997
(Continued)

OTHER PUBLICATIONS

International Search Report and Written Opinion of the International Searching Authority, dated Jan. 19, 2007.
(Continued)

Primary Examiner — Steven B McAllister
Assistant Examiner — Samantha Probst
(74) Attorney, Agent, or Firm — Knobbe Martens Olson & Bear LLP

(57) ABSTRACT

A passive ventilation control system and method. The system includes passive vents throughout a building. The vents may be arranged in multiple sets, with each set being substantially vertically aligned through multiple floors or the entire height of the building. Sensors are positioned inside and/or outside the building for sensing different environmental parameters or atmospheric conditions. The sensors send signals to a controller, which automatically adjusts airflow through the vents in response to the signals from the sensors.

14 Claims, 15 Drawing Sheets

(51) Int. Cl.
*F24F 110/20* (2018.01)
*F24F 110/50* (2018.01)

(56) References Cited

U.S. PATENT DOCUMENTS

| | | | |
|---|---|---|---|
| 2,299,317 A * | 10/1942 | Fink | 49/249 |
| 2,341,113 A | 2/1944 | Nelson | |
| 2,789,493 A | 4/1957 | Riggle | |
| 3,079,853 A | 3/1963 | Smith | |
| 3,802,327 A | 4/1974 | Otsuka | |
| 4,051,999 A * | 10/1977 | Granger et al. | 126/591 |
| 4,201,121 A | 5/1980 | Brandenberg, Jr. | |
| 4,290,554 A * | 9/1981 | Hensley | 236/49.5 |
| 4,324,289 A * | 4/1982 | Lahti | 165/48.2 |
| 4,432,273 A | 2/1984 | Devitt | |
| 4,602,739 A | 6/1986 | Sutton, Jr. | |
| 4,633,769 A * | 1/1987 | Milks | 454/117 |
| 4,651,805 A * | 3/1987 | Bergeron, Jr. | 165/45 |
| 4,977,818 A | 12/1990 | Taylor et al. | |
| 5,081,912 A * | 1/1992 | Clenet | 454/136 |
| 5,333,783 A | 8/1994 | Catan | |
| 5,447,470 A | 9/1995 | Zaniewski | |
| 5,528,229 A | 6/1996 | Mehta | |
| 5,609,522 A * | 3/1997 | Szwartz | 454/7 |
| 5,620,368 A | 4/1997 | Bates et al. | |
| 5,722,887 A | 3/1998 | Wolfson et al. | |
| 5,813,599 A | 9/1998 | Hoff | |
| 5,934,993 A | 8/1999 | Maruyama | |
| 6,036,102 A * | 3/2000 | Pearson | 236/49.3 |
| 6,077,159 A | 6/2000 | Clayton | |
| 6,129,628 A | 10/2000 | O'Hagin et al. | |
| 7,097,557 B2 * | 8/2006 | Kutschman | 454/276 |
| 7,497,774 B2 * | 3/2009 | Stevenson et al. | 454/354 |
| 7,507,151 B1 * | 3/2009 | Parker et al. | 454/368 |
| 8,079,898 B1 * | 12/2011 | Stevenson | 454/328 |
| 2003/0159802 A1 | 8/2003 | Steneby et al. | |
| 2005/0239394 A1 | 10/2005 | O'Hagin et al. | |
| 2006/0052047 A1 | 3/2006 | Daniels, II | |

FOREIGN PATENT DOCUMENTS

| | | |
|---|---|---|
| EP | 1 085 271 A2 | 9/2000 |
| EP | 1 225 399 A1 | 1/2001 |
| EP | 1085271 A2 | 3/2001 |
| EP | 1225399 A1 | 7/2002 |
| GB | 2 196 032 A | 4/1988 |
| GB | 2 386 944 A | 10/2001 |
| JP | 57070338 | 4/1982 |
| JP | 59-060138 | 4/1984 |
| JP | 10110480 A | 4/1998 |
| JP | 11029992 A | 2/1999 |
| JP | 2001221474 A | 8/2001 |
| JP | 2002121833 | 4/2002 |
| JP | 2003 082782 | 3/2003 |
| JP | 2003185207 | 7/2003 |
| WO | WO 86/07438 | 12/1986 |
| WO | WO 00/39506 | 7/2000 |

OTHER PUBLICATIONS

International Search Report and Written Opinion for International Application No. PCT/US2006/036744, dated Jan. 19, 2007.

* cited by examiner

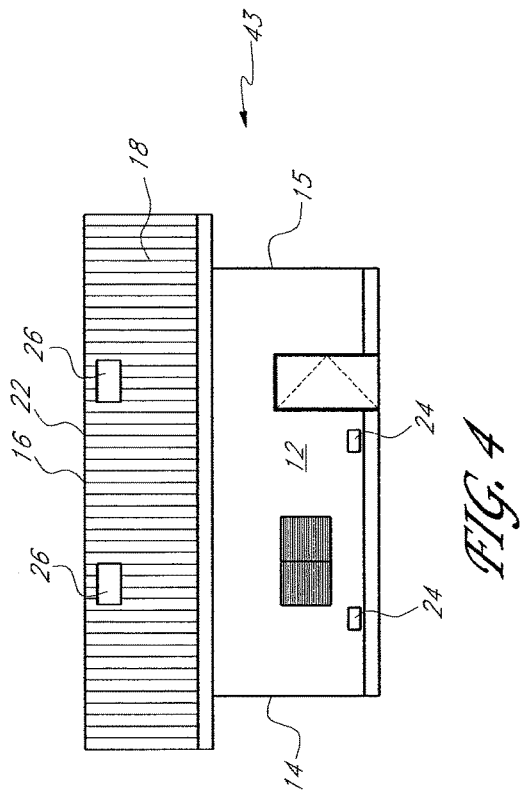
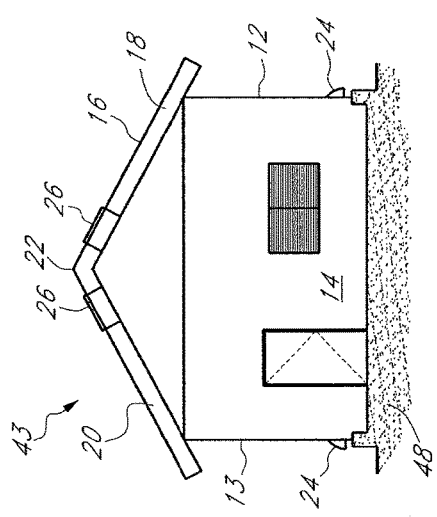
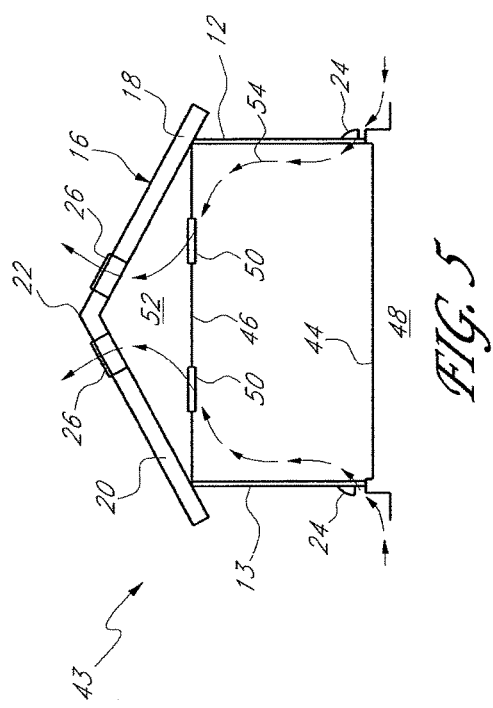
FIG. 4
FIG. 3
FIG. 5

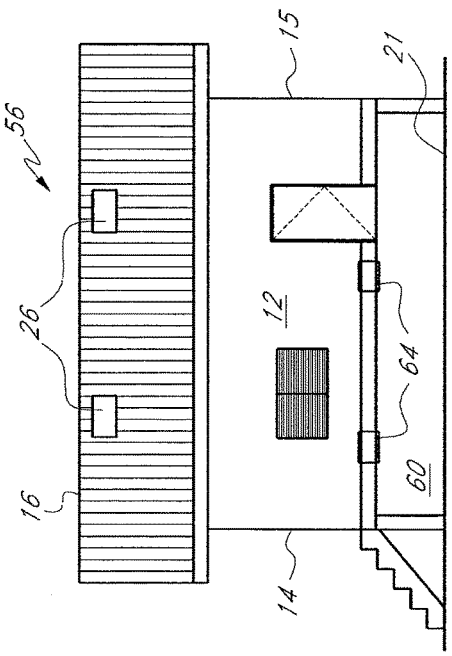
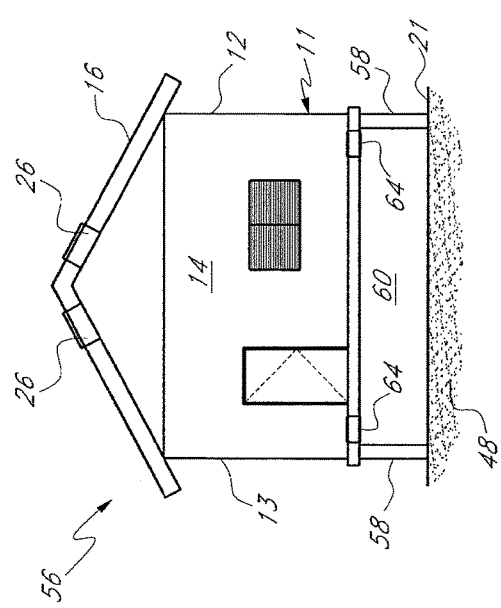
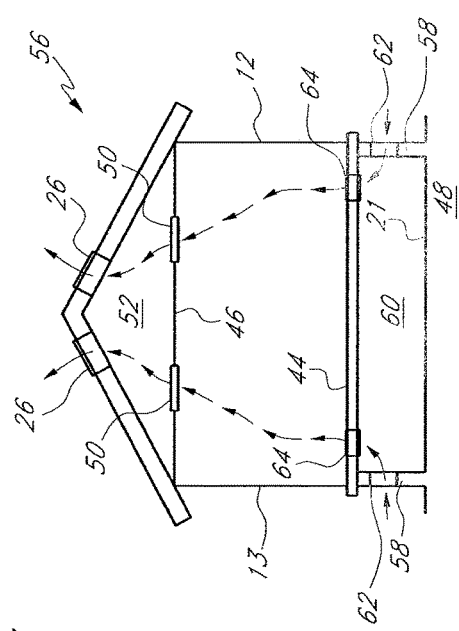
FIG. 6
FIG. 7
FIG. 8

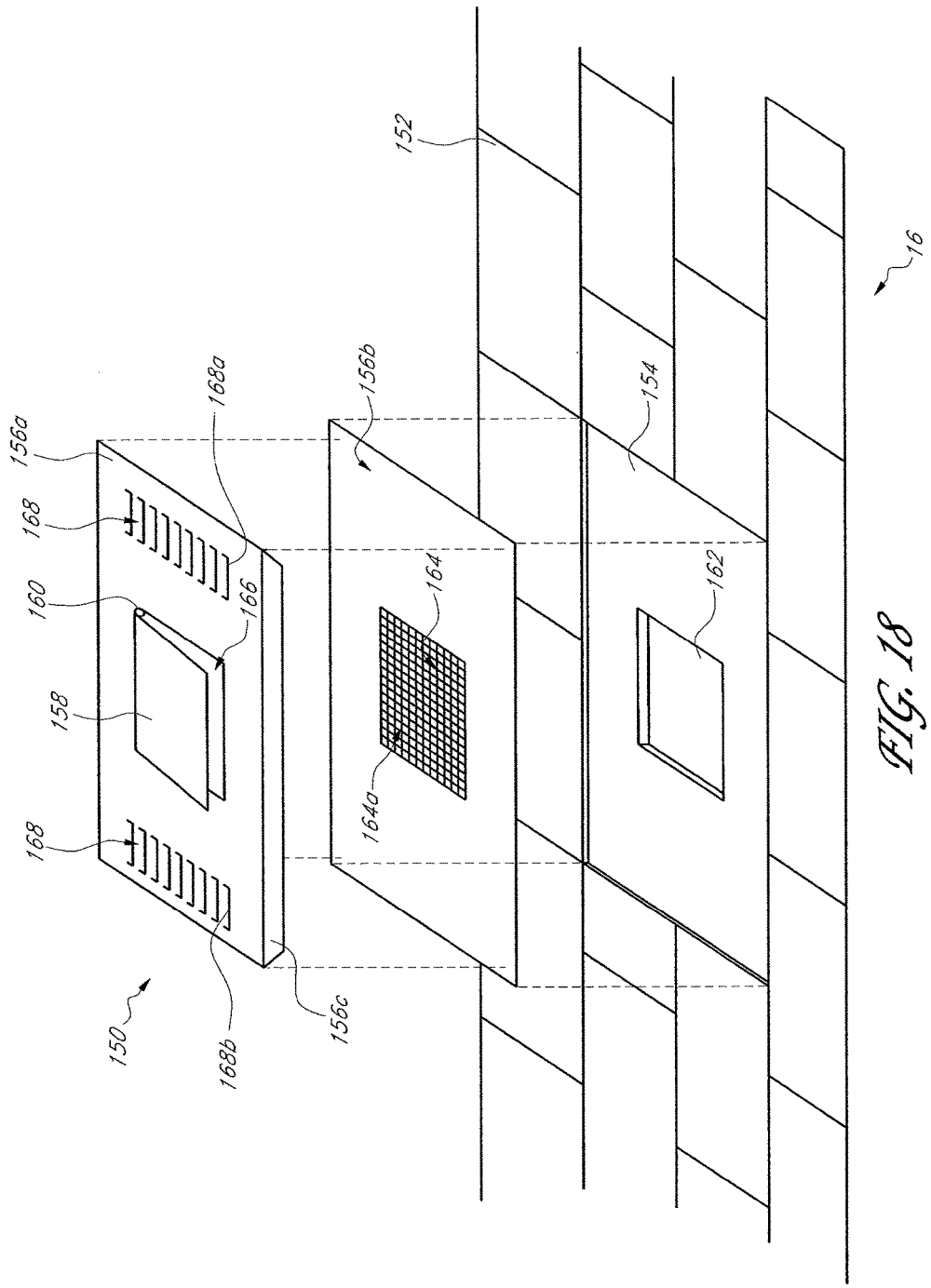

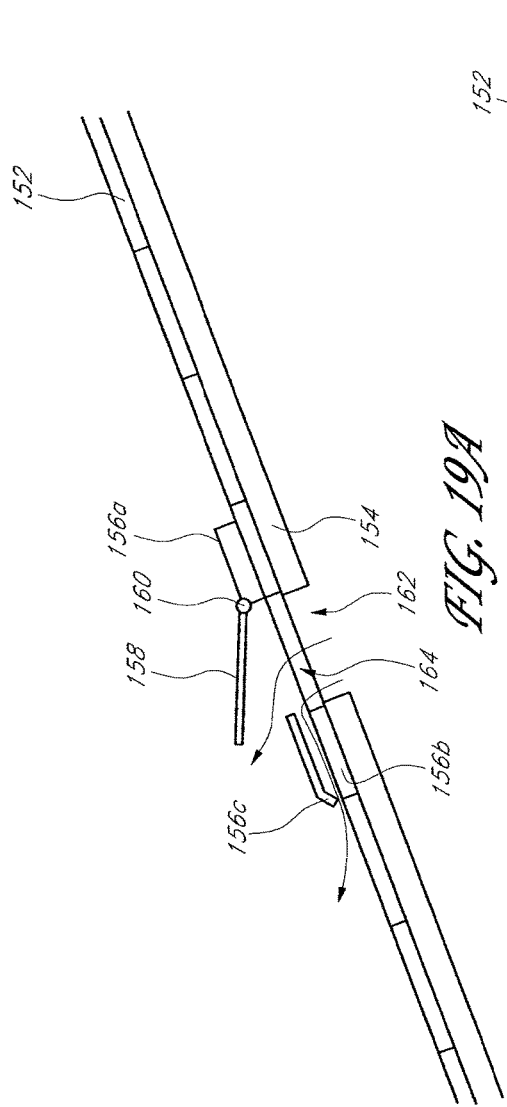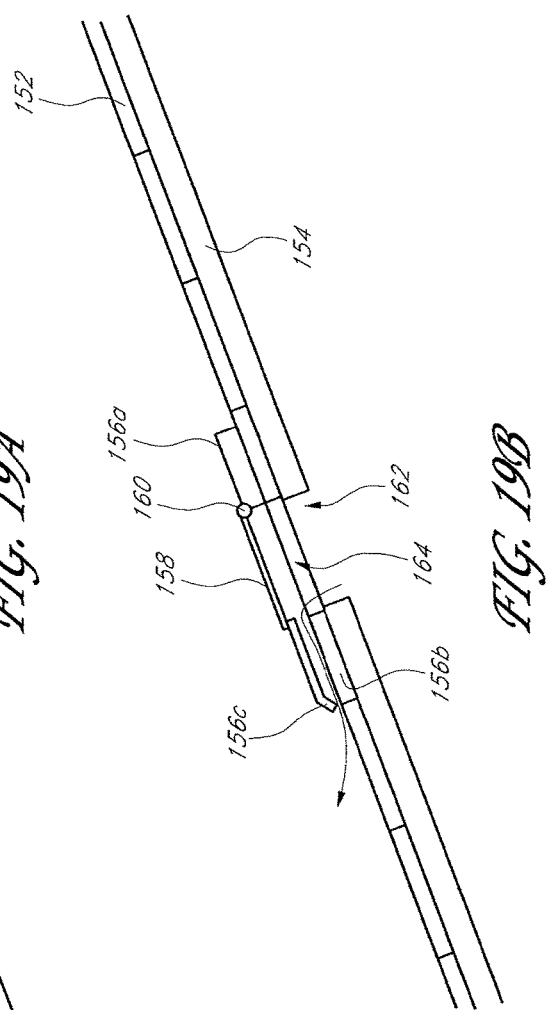

PASSIVE VENTILATION CONTROL SYSTEM

REFERENCE TO RELATED APPLICATIONS

This application claims the benefit of U.S. Provisional Patent Application No. 60/721,673, filed on Sep. 23, 2005 and the benefit of U.S. Provisional Patent Application No. 60/795,905, filed on Apr. 27, 2006.

BACKGROUND OF THE INVENTION

Field of the Invention

This invention relates generally to building ventilation and specifically to systems and methods for controlling passive ventilation.

Description of the Related Art

Many buildings are ventilated with so-called "active ventilation" or "mechanical ventilation" apparatus, which typically involves the use of mechanical devices such as fans, air conditioners, etc., which create a forced flow of air through various ducts and vents of the building. In many cases, it is desirable to avoid active ventilation in order to reduce energy requirements.

So-called "passive ventilation" involves an arrangement of vents within a building, without mechanical devices that create a forced flow of air. For example, roof-vents are often placed within the roof of a house to permit airflow between the attic and the house exterior. FIG. 1 shows a house 1 including exterior walls 2, a floor 3, a ceiling 4, and a roof 5 such that an attic space 7 is defined between the ceiling and the roof. The roof includes roof-vents 6, which allow for ventilation of the attic space 7. While this permits ventilation of the attic, the remainder of the house is usually not passively ventilated because the attic is closed off from the rest of the house.

In some cases, passive ventilation has been used outside of the context of only the attic. Some buildings, particularly European homes, employ "passive stack ventilation," in which the house includes "stack vents" (i.e., pipes or ducts) with lower ends terminating in rooms likely to have higher pollutant levels, such as kitchens, bathrooms, and laundry rooms, and upper ends extending vertically through the roof. These stack vents are also sometimes referred to as "soil vents."

In a typical design employing passive stack ventilation, a room of a building is provided with wall-vents near the lower edges of the vertical walls that define the room, the wall-vents communicating with the exterior of the building. The room also includes an open lower end of a stack vent. The stack vent typically extends upward through the ceiling of the room and eventually through the roof of the building, terminating at an upper open end. The stack vent typically also extends upward through other rooms and/or an attic of the building. Similarly, other rooms may be ventilated with additional wall-vents and stack vents. Air ventilation through the passive stack ventilation system is primarily caused by pressure differences derived from: (1) wind flow passing over the building and the upper end of the stack vent, which causes a venturi effect in the stack vents, and (2) buoyancy differences between indoor and outdoor air. If, as is often the case, indoor air temperatures are higher than outdoor temperatures, the warmer and less dense indoor air tends naturally to rise up through the ventilating stack vents. As the indoor air rises, it draws in cooler outdoor air through the wall-vents.

A practical drawback of passive stack ventilation is that stack vents are relatively small. The stack vents typically cannot effectively ventilate the whole building unless the building is very small or unless many stack vents are provided. The small size of a stack vent or pipe makes it difficult for atmospheric pressure to produce significant airflow through the vents, regardless of whether they extend upward through the roof, outward through the walls, or downward through the floor and then outward and upward through the ground outside of the building. Effective ventilation often involves the use of one or more pumps or other forms of artificially induced pressure.

Traditional rural huts in countries such as Thailand, Malaysia, and the Philippines use thatched bamboo walls and thatched roofs through which air can flow. Such huts are often raised above the ground with the floors also having openings through which air may flow.

SUMMARY OF THE INVENTION

In accordance with an embodiment, a method is provided for controlling a system of passive vents arranged within a building. One or more atmospheric conditions is measured. The atmospheric conditions include: a) a pressure differential between an interior of the building and an exterior of the building; b) a temperature differential between the interior of the building and the exterior of the building; c) a humidity differential between the interior of the building and the exterior of the building; d) a rate of airflow through at least one of the vents; e) a rate of air changes in the building; and f) a concentration of particulate matter in the building interior. The flow areas of one or more of the vents are automatically adjusted in response to the measurements.

In accordance with another embodiment, a system if provided for controlling passive ventilation. The system includes a plurality of passive vents arranged throughout a building, sensors, and a controller. The sensors measure one or more of the following: a) a pressure differential between an interior of the building and an exterior of the building; b) a temperature differential between the interior of the building and the exterior of the building; c) a humidity differential between the interior of the building and the exterior of the building; d) rates of airflow through the vents; e) a rate of air changes in the building; and f) a concentration of particulate matter in the interior of the building. The controller is configured to receive measurement signals from the sensors and automatically adjust flow areas of the vents in response to the signals.

In accordance with another embodiment, a roof vent is provided. The roof vent includes a vent member, a vent door, and an actuator. The vent member includes an opening and is configured to be secured at an aperture in a roof so that the opening permits airflow through the aperture and the opening between regions above and below the roof. The vent door is operatively connected to the vent member. The vent door has an open position in which the vent door permits airflow through the opening and a closed position in which the vent door substantially prevents airflow through the opening. The actuator is configured to move the vent door between the open and closed positions based on ambient temperature.

In accordance with yet another embodiment, a roof vent is provided. The roof vent includes a vent member, a vent door, a motor, a solar panel, a battery, and a controller. The vent member includes an opening and is configured to be secured at an aperture in a roof so that the opening permits airflow through the aperture and the opening between regions above and below the roof. The vent door is operatively connected to the vent member. The vent door has an open position in which the vent door permits airflow through the opening and a closed position in which the vent door substantially prevents airflow through the opening. The motor is configured to move the vent door between the open and closed positions. The solar panel is positioned to receive solar radiation. The battery is electrically connected to the solar panel. The controller is configured to be in electrical communication with the battery and the motor, the controller being configured to drive the motor based on at least one environmental parameter, the motor being driven by power received from the battery.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIG. 3 is a front view of a building of the type shown in FIG. 2.

FIG. 4 is a side view of the building of FIG. 3.

FIG. 5 is a front sectional view of the building of FIG. 3.

FIG. 6 is a front view of a building with a system of vents according to another embodiment.

FIG. 7 is a side view of the building of FIG. 6.

FIG. 8 is a front sectional view of the building of FIG. 6.

FIG. 18 is an exploded perspective view of a self-adjusting roof-vent positioned in a roof in accordance with an embodiment.

FIGS. 19A and 19B are schematic cross-sectional views of the roof-vent of FIG. 18.

Figure 1:
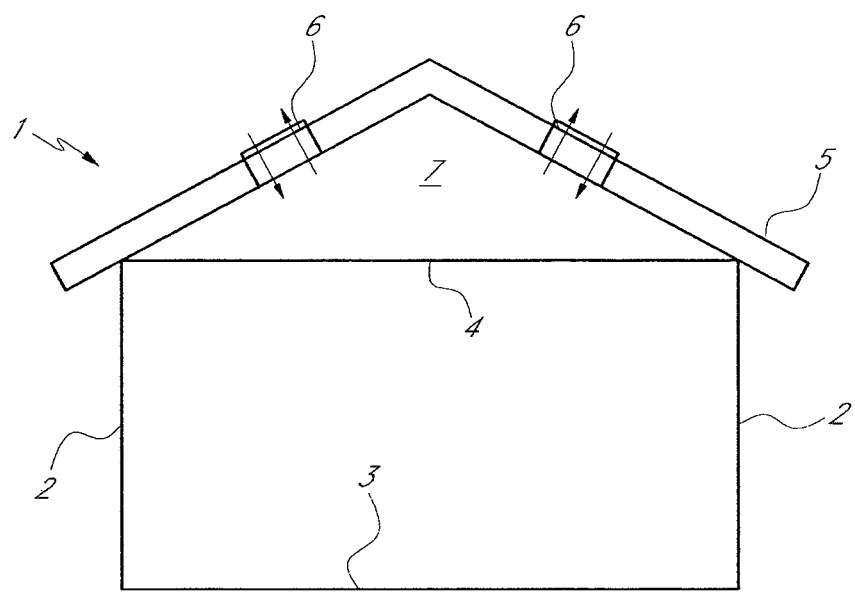
FIG. 1 is a front sectional view of a conventional building with vents in the roof.

Some of the figures may include elements that are not drawn to scale with respect to one another.

DETAILED DESCRIPTION OF THE PREFERRED EMBODIMENT

Conventional systems for passive ventilation of buildings are limited in their ability to adequately ventilate a building. For example, while passive stack ventilation provides some passive ventilation of a building, it has been restricted to kitchens, bathrooms, and/or laundry rooms. While the stack vents may extend through other (non-pollutant) rooms of the building, they do not permit venting of such rooms because the stack vents do not fluidly communicate with such rooms. Also, passive stack ventilation is somewhat restricted because it involves the flow of air through elongated stack vents, which sometimes include turns and irregular configurations. Adequate ventilation through the stack vents is often dependent upon suction at the upper ends of the stack vents, due to a venturi effect caused by winds above the building. The stack vents inhibit the building from "breathing" freely. Thus, buildings having stack vents, perhaps in combination with vents in the floor or exterior walls, provide less than optimal ventilation.

As used herein, a "dividing-structure vent" (sometimes referred to as a "non-stack vent") is a vent that is formed in a roof, ceiling, floor, wall, or the like and which is not a stack vent. In other words, a dividing-structure vent defines an opening in a dividing structure or material layer, and the opening does not involve an elongated pipe or other structure extending generally through the dividing structure. Skilled artisans will appreciate that there are a wide variety of different types of dividing-structure vents. A dividing-structure vent may include materials for visually blending the vent with the dividing structure so that it is inconspicuous. A dividing-structure vent may also include screens, filters, and other such components for preventing the flow of matter other than air (e.g., water, vermin, insects, dust, plants, leaves, etc.) through the vent. Dividing-structure vents are less restrictive and facilitate less restrictive ventilation because the air does not have to flow through stack vents, i.e., relatively narrow elongated structures. Also, a dividing-structure vent permits airflow between the general airspace on two sides of a dividing structure, while a stack vent only communicates with the space inside the stack vent. Typically, a dividing-structure vent is oriented generally along a planar portion defined by the dividing structure. Also, a dividing-structure vent oriented generally along the planar portion may either be substantially entirely contained within the dividing structure or may protrude to some degree outside of the dividing structure. A dividing-structure vent may comprise a wall vent, roof-vent, ceiling vent, ceiling-floor vent, or underfloor-vent, as these terms are used and described herein.

Some known passive ventilation systems include dividing-structure vents in the exterior walls and roof of a building. Some known systems include dividing-structure vents in the exterior walls, the roof, and the horizontal divisions that define the separate stories of a multistory building. While these systems provide some degree of passive ventilation for the building, it is often insufficient to obviate the need for mechanical ventilation. There is a need for a more comprehensive passive ventilation system involving dividing-structure vents, to permit the building to "breathe" freely, particularly for multiple-story buildings.

The aforementioned traditional rural huts in countries such as Thailand, Malaysia, and the Philippines provide very good ventilation because air can flow relatively freely through the thatched walls and roof and the slots in the elevated floor. However, such a design is generally not desirable for use in industrialized countries for a variety of reasons. One such reason is that such a design does not involve air-impervious walls, floors, ceilings, and roofs, making it very expensive to heat up the building in colder weather and cool down the building in warmer weather.

Arrangement of Dividing-Structure Vents

Figure 2:
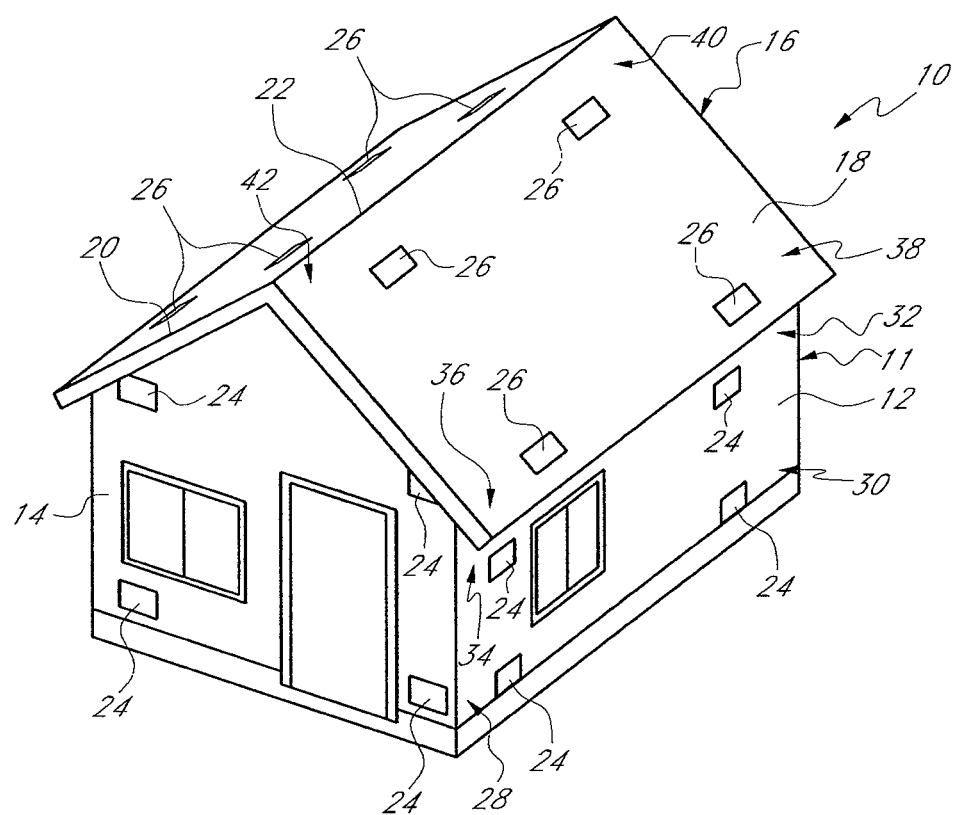
FIG. 2 is a perspective view of a building with a system of vents according to one embodiment.

FIG. 2 shows a building 10, such as a home, having a system of vents according to an embodiment. While the illustrated building 10 is single-story, it will be understood from the description below that the principles of the embodiments described herein can be used in multiple-story buildings as well. The building 10 includes a generally vertical exterior wall structure 11 defining an outer periphery of the building. In the illustrated embodiment, the exterior wall structure 11 comprises a plurality of generally vertical walls joined together, including exterior walls 12 and 14. While not shown in FIG. 2, the building 10 includes additional exterior walls behind the walls 12 and 14, such that the exterior walls collectively form the building periphery. Preferably, the plurality of exterior walls are joined together to form a closed perimeter, which defines the interior area of the building. In other embodiments, the exterior wall structure 11 may comprise a single wall that is curved to form an enclosed perimeter (e.g., a circular or oval structure). The building 10 also includes a roof 16. In the illustrated embodiment, the roof 16 includes two generally flat and sloped sides or roof fields 18 and 20 that are joined together at a top ridge 22. However, other roof configurations are also possible, such as a generally flat horizontal roof. The roof 16 can be formed of a variety of materials, including metal (e.g., corrugated metal). While not shown in FIG. 2, the building 10 also includes a bottom floor that is at least partially surrounded by the exterior wall structure 11.

Preferably, the exterior wall structure 11 is substantially air-impervious with the exception of a plurality of wall-vents 24 in the exterior walls of the building. As used herein, the phrase "substantially air-impervious" describes a material or structure through which air substantially cannot pass, but does not exclude the presence of openings that can be opened and closed, such as doors and windows. Each wall-vent 24 permits airflow through the exterior wall within which that particular wall-vent is located, so that air can flow relatively freely through the vent 24 between the airspace immediately outward of the wall and the airspace immediately inward of the wall (wherein "inward" refers to the region within the building and "outward" refers to the region outside of the building). Each wall-vent 24 is preferably configured to permit airflow both inward and outward.

In the illustrated embodiment, each of the exterior walls of the building 10 has a plurality of "corner sections." As used herein, a corner section refers to a section near an intersection of three dividing structures or material layers (e.g., a wall, roof, floor, or the like). For example, the exterior wall 12 includes bottom corner sections 28 and 30 and top corner sections 32 and 34. While the illustrated exterior wall 12 includes four corners and corner sections, it will be understood that walls can have a wide variety of different shapes with three, four, or more corners and corner sections. As used herein, a vent in a "corner section" includes vents that are near the corner defined by the dividing structures but not necessarily exactly at the corner. By herein stating that a vent is in a corner section associated with a corner of a room, floor, roof, ceiling-floor, interior wall, exterior wall, or other dividing structure (as such terms are described elsewhere herein), it is meant that the nearest portion of the vent is preferably within 36 inches, more preferably within 12 inches, and even more preferably within 6 inches of the corner. Preferably, wall-vents 24 are provided in one or more of the corner sections of each exterior wall. More preferably, wall-vents 24 are provided in at least half of the corner sections of each exterior wall. Even more preferably, wall-vents 24 are provided in all of the corner sections of each exterior wall. Advantageously, placing wall-vents 24 at the corner sections of the exterior walls facilitates better passive ventilation.

Preferably, the roof 16 is substantially air-impervious with the exception of one or more roof-vents 26 therein. Each roof-vent 26 permits airflow through the roof 16, so that air can flow relatively freely and generally vertically through the vent 26, between the general airspace immediately below the roof and within the building 10 and the general airspace immediately above the roof 16. The roof-vents 26 are preferably dividing-structure vents. Each roof-vent 26 is preferably configured to permit airflow both upward out of the building 10 and downward into the building 10.

In the illustrated embodiment, each of the sides or roof fields 18 and 20 of the roof 16 has a plurality of corner sections. For example, the roof field 18 of the roof 16 includes bottom corner sections 36 and 38 and top corner sections 40 and 42. While the illustrated roof field 18 of the roof 16 includes four corner sections, it will be understood that roofs and/or roof fields can have a wide variety of different shapes with three, four, or more corner sections. Preferably, roof-vents 26 are provided in one or more of the corner sections of each roof or roof field. By herein stating that a vent is in a corner section associated with a corner of a roof, it is meant that the nearest portion of the vent is preferably within 36 inches, more preferably within 12 inches, and even more preferably within 6 inches of the corner of the interior structure that the roof overlies, as opposed to the corner of an overhanging roof. More preferably, roof-vents 26 are provided in at least half of the corner sections of each roof or roof field. Even more preferably, roof-vents 26 are provided in all of the corner sections of each roof or roof field. Advantageously, placing roof-vents 26 at the corner sections of the roofs or roof fields facilitates better passive ventilation. It is also desirable to locate the roof-vents 26 at or near to the highest location of the building interior, since it is such areas to which hot air rises.

FIGS. 3-5 show a single-story building 43 that is similar to the building 10 shown in FIG. 2, wherein the same numerals refer to like aspects of the buildings. FIGS. 3 and 4 show front and side views, respectively, of the building 43. FIG. 5 shows a front sectional view of the building 43. The building 43 is formed on a foundation 48 as known in the art. Unlike the building 10 of FIG. 2, the exterior walls 12, 13, 14, and 15 of the building 43 only include wall-vents 24 near their bottom edges and not near their top edges. However, additional wall-vents 24 could be provided near the top edges of the exterior walls if desired. Also unlike the building 10 of FIG. 2, the roof fields 18 and 20 of the roof 16 only include roof-vents 26 near the ridge 22 and not near their bottom edges. However, additional roof-vents 26 could be provided near the bottom edges of the roof fields 18 and 20 of the roof 16 if desired.

As seen in FIG. 5, the building 43 includes a generally horizontal bottom floor 44 and a ceiling 46. In the illustrated embodiment, the ceiling 46 is generally horizontal and is positioned below the roof 16 so that the ceiling 46 and the roof 16 define an attic airspace 52 therebetween. Skilled artisans will understand that, in some embodiments, there is only a ceiling or only a roof, but not both. Preferably, the ceiling 46 is substantially air-impervious except for the presence of one or more ceiling-vents 50 therein. Each ceiling-vent 50 is preferably a dividing-structure vent that permits airflow between the general attic airspace 52 and a general airspace immediately below the ceiling 46. Each ceiling-vent 50 is preferably configured to permit airflow both upward into the attic space 52 and downward below the ceiling 46.

With continued reference to FIG. 5, the building 43 facilitates a relatively less restricted flow of air upward (depicted by arrows 54), compared to conventional passive ventilation designs and particularly passive stack ventilation systems. The indoor air tends to flow upward due to pressure differences derived from: (1) wind flow passing over the roof 16, which causes a venturi effect in the roof-vents 26, and (2) buoyancy differences between indoor and outdoor air. The indoor air rises upward relatively freely (compared to passive stack ventilation systems) through the interior of the building and flows through the ceiling-vents 50 of the ceiling 46 into the attic space 52. From the attic space 52, the indoor air continues to rise relatively freely through the roof-vents 26 of the roof 16 and exits the building 43. According to this embodiment, as the indoor air rises, it draws in cooler outdoor air through the wall-vents 24 near the bottom edges of the exterior walls 12, 13, 14, and 15.

FIGS. 6-8 show a building 56 with a system of vents according to another embodiment. FIGS. 6 and 7 show front and side views, respectively, of the building 56. FIG. 8 shows a front sectional view of the building 56. The building 56 is similar in most respects to the building 43 shown in FIGS. 3-5, except that the bottom floor 44 is raised above the foundation 48. In one embodiment, the bottom floor 44 and exterior wall structure 11 are elevated above a ground level 21 such that air outside of the outer periphery of the building 56 can freely flow underneath the bottom floor 44. For example, support structures 58 can be provided for supporting the exterior wall structure 11 and bottom floor 44. In one configuration, the support structures 58 comprise supports positioned at the corners and other discrete locations of the building 56, as may be necessary to adequately support the building. In another configuration, the support structures 58 comprise walls, which may extend along the building periphery. The support structures 58 can be materially different (e.g., concrete foundation) and structurally separate from the exterior wall structure 11. Alternatively, the support structures 58 can comprise walls that are materially similar to and/or are extensions or portions of the exterior wall structure 11 of the building 56, such as portions of the exterior walls 12, 13, 14, and 15.

In the illustrated embodiment, the support structures 58 comprise walls that define a peripherally enclosed airspace 60 below the bottom floor 44, and the building 56 includes one or more "underfloor-vents" 62 configured to permit airflow between the exterior of the building 56 and the enclosed airspace 60. As used herein, an "underfloor-vent" is a vent that facilitates the flow of air between the exterior of the building and an airspace below the bottom floor of the building. In the illustrated embodiment, the underfloor-vents 62 comprise wall-vents in the support structure walls 58. However, other types of underfloor-vents can be used, such as pipes or ducts that may extend partially underground. The underfloor-vents 62 may extend laterally within the walls 58, perhaps as much as 80% of the sides of the building. The underfloor-vents 62 may comprise louvers covered with plastic or wire mesh on a wire back, such as chicken wire or even something stronger, in order to prevent the ingress of small animals, debris, plants, and the like. In one embodiment, the underfloor-vents 62 are about 10 inches in vertical height, and each is about 10×10 inches in area.

In the building 56, the elevated bottom floor 44 is preferably substantially air-impervious except for the presence of one or more floor-vents 64 therein. Each floor-vent 64 permits airflow through the bottom floor 44. More particularly, each of the floor-vents 64 is preferably a dividing-structure vent permitting airflow generally vertically through the bottom floor 44, between a general airspace immediately above the bottom floor 44 and the airspace 60 immediately below the bottom floor 44. Thus, the underfloor-vents 62, floor-vents 64, ceiling-vents 46, and roof-vents 26 produce a generally upward ventilation of air through the building 56, as depicted by arrows in FIG. 8.

Figure 9:
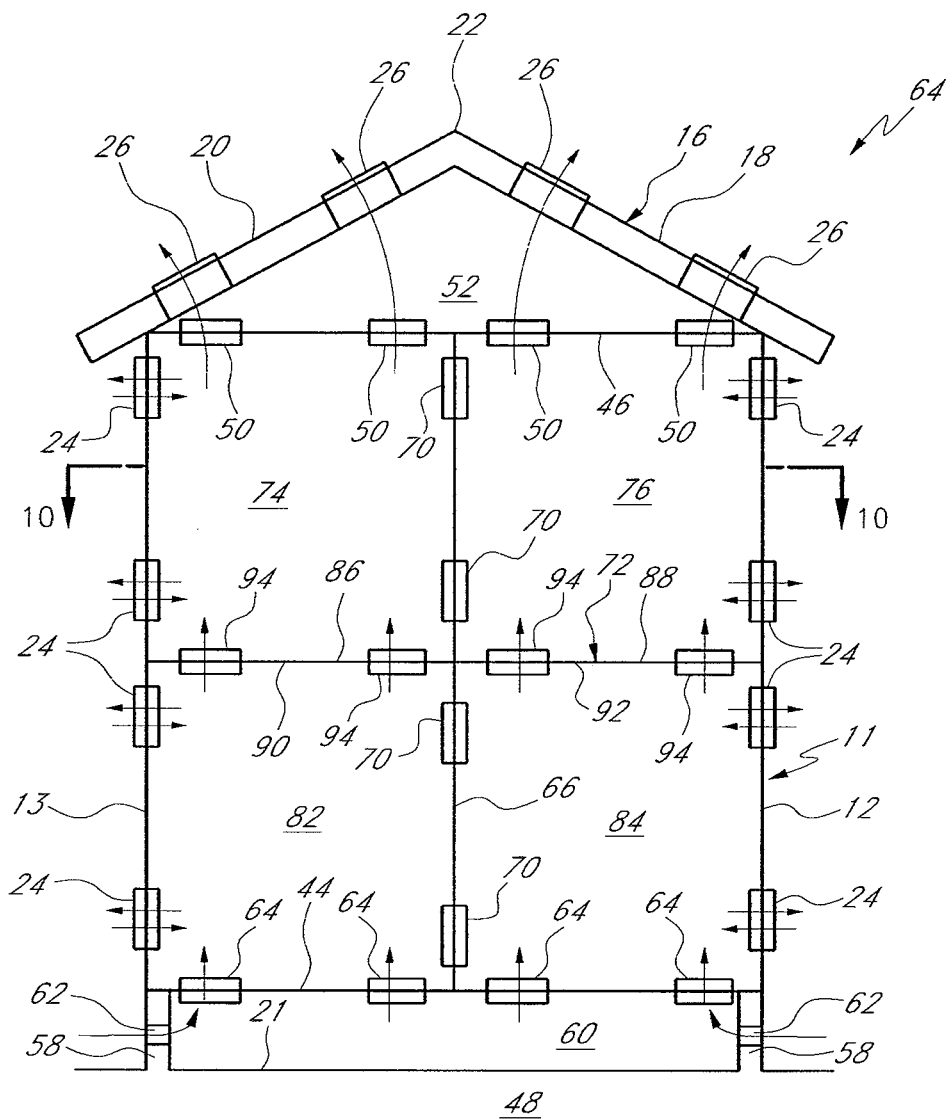
FIG. 9 is a front sectional view of a building with a system of vents according to another embodiment, taken along line 9-9 of FIG. 10.
Figure 10:
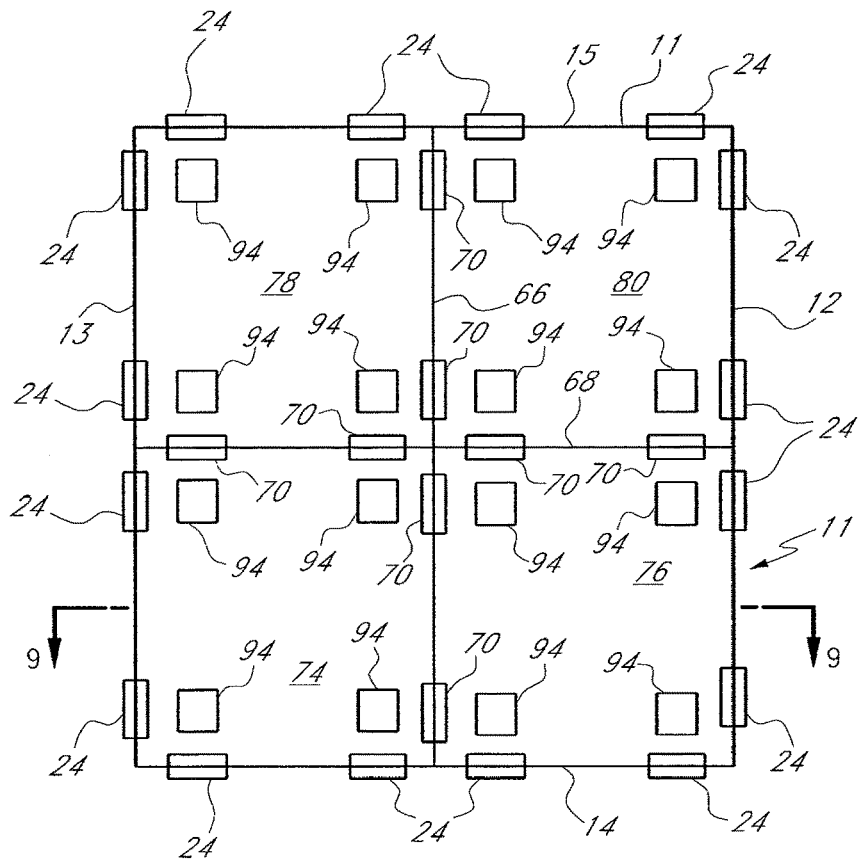
FIG. 10 is a top sectional view of the building of FIG. 9, taken along line 10-10 thereof.

FIGS. 9 and 10 illustrate an embodiment of a building having multiple stories and multiple internal rooms. In particular, in the illustrated embodiment shown in FIGS. 9 and 10, the building 64 has two stories and four rooms per story, for a total eight rooms. Skilled artisans will understand that the building can have any number of stories and any number of rooms per story. Also, the rooms can vary in size and shape relative to one another, as is the case in a typical building. The building 64 includes an exterior wall structure 11 (comprising exterior walls 12, 13, 14, and 15), a bottom floor 44, a roof 16, and a ceiling 46, substantially as described in the aforementioned embodiments. Like the building 56 shown in FIGS. 6-8, the building 64 is raised above the top surface 21 of a foundation 48 by supports 58, which in the illustrated embodiment comprise walls with underfloor wall-vents 62, as described above. It will be understood that the building 64 could alternatively be set directly upon a foundation 48, in the manner shown in FIGS. 2-5.

With continued reference to FIGS. 9 and 10, the illustrated building 64 includes two interior walls 66 and 68 within the exterior wall structure 11. The interior walls 66 and 68 each extend vertically from the bottom floor 44 to the ceiling 46. In other embodiments, the interior walls may extend vertically within only one or more stories, without extending completely from the bottom floor 44 to the ceiling 46. The interior wall 66 extends horizontally from the exterior wall 14 to the exterior wall 15, and the interior wall 68 extends horizontally from the exterior wall 12 to the exterior wall 13. In other embodiments, the interior walls 66, 68 do not extend horizontally to the exterior walls of the building. The illustrated interior walls 66 and 68 intersect to define four interior rooms per story of the building. For example, the top story of the building 64 includes four interior rooms 74, 76, 78, and 80. Each of the interior walls 66 and 68 preferably acts as a division between two of the rooms. Preferably, each of the interior walls 66 and 68 is substantially air-impervious except for the presence of one or more wall-vents 70 therein. Each of the wall-vents 70 preferably permits airflow through the interior wall within which said wall-vent is located. Skilled artisans will understand that any number of interior walls (including just one interior wall) can be provided to result in different numbers of interior rooms, and that the principles of the present invention are applicable to such variations.

The building 64 can include one or more generally horizontal structures 72 elevated above the bottom floor 44 and dividing the building into multiple stories. The number of horizontal structures 72 defines the number of stories of the building 64. Typically, the number of stories is one greater than the number of horizontal structures 72. Of course, different and/or irregular configurations are possible, including mezzanine levels and the like. The illustrated building 64 includes only one horizontal structure 72 and is thus a two-story building. Each of the horizontal structures 72 preferably defines one or more floors of interior rooms immediately above the horizontal structure. For example, the illustrated horizontal structure 72 defines floors 86 and 88 of the interior rooms 74 and 76 immediately above the horizontal structure. In the illustrated embodiment, the floors 86 and 88, as well as the floors of the interior rooms 78 and 80, are defined by one horizontal structure 72 and may be understood as one unitary floor. Each of the horizontal structures 72 also preferably defines one or more ceilings of interior rooms immediately below the horizontal structure. For example, the illustrated horizontal structure 72 defines ceilings 90 and 92 of interior rooms 82 and 84 immediately below the horizontal structure. In the illustrated embodiment, the ceilings 90 and 92, as well as the ceilings of the interior rooms directly behind the rooms 82 and 84 in FIG. 9, are defined by one horizontal structure 72 and may be understood as one unitary ceiling. Preferably, each of the horizontal structures 72 is substantially air-impervious except for the presence of at least one "ceiling-floor vent" 94 therein. Each ceiling-floor vent 94 preferably permits airflow generally vertically through the horizontal structure 72 of that vent 94, between the general airspace immediately above and below the horizontal structure 72. In one embodiment, the ceiling-floor vents 94 are substantially identical to the ceiling-vents 50. It will be understood that the dividing structure vents (e.g., 24, 26, 50, 64, 62, 70, 94) can be electromechanically controlled or adjusted, such as the vents shown in FIGS. 16-22 and described below.

Figure 14B:
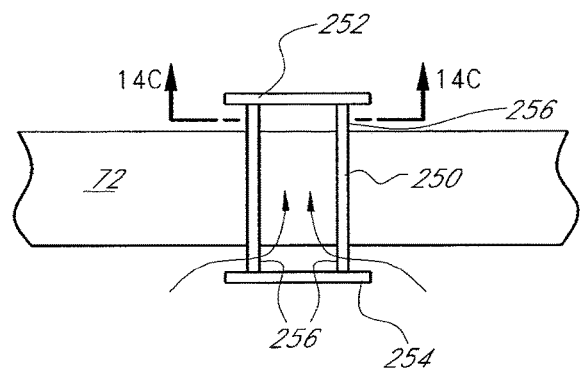
FIG. 14B is vertical sectional view of the ceiling-floor vent of FIG. 14A, embedded within a planar dividing structure.
Figure 14A:
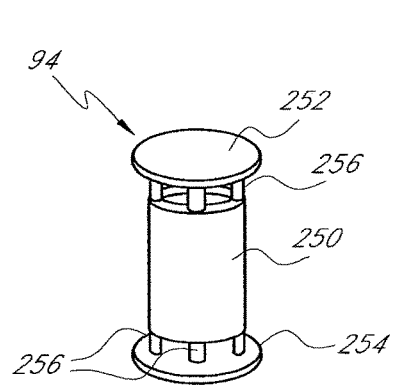
FIG. 14A is a perspective view of a static ceiling-floor vent according to one embodiment of the present invention.
Figure 14C:
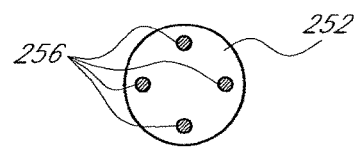
FIG. 14C is a sectional view of the ceiling-floor vent of FIGS. 14A and 14B, taken along line 14C-14C of FIG. 14B.

FIGS. 14A-C illustrate one embodiment of a static ceiling-floor vent 94. It will be understood that ceiling-floor vents can be electromechanically adjustable or static, and that this embodiment of the ceiling-floor vent 94 is an example of a static vent. With reference to FIG. 14A, the vent 94 comprises a cylinder 250, an upper cap 252 secured to an upper end of the cylinder 250, and a lower cap 254 secured to a lower end of the cylinder 250. The caps 252 and 254 are secured to the cylinder 250 in a manner that permits air to enter the cylinder 250 from one end and exit the cylinder from the other end. In the illustrated embodiment, the caps 252 and 254 are secured to the cylinder 250 by short spacer rods 256. FIG. 14B shows the vent 94 deployed in a horizontal dividing structure 72 that defines the ceiling of a room below and the floor of a room above. The cylinder 250 is embedded within the dividing structure 72 so that its ends extend above and below the upper and lower surfaces of the structure 72. As shown in FIG. 14C, the illustrated vent 94 includes four spacer rods 256 at each end of the cylinder 250. However, it will be understood that any number of spacer rods 256 (but preferably at least three for structural stability) can be provided at each end. The vent 94 can be installed by drilling a hole within the dividing structure 72, inserting the cylinder 250 therein (preferably with a relatively tight fit), and then securing the caps 252 and 254 to the cylinder 250 (e.g., by welding the caps and spacer rods 256 onto the cylinder 250). Optionally, a filler material (e.g., resinous material such as polyurethane or standard wall filler materials) can be provided between the cylinder 250 and the dividing structure 72 for improved adhesion, air-tightness, and/or stability.

Referring again to FIGS. 9 and 10, it will be understood that, in the building 64, each of the exterior walls 12, 13, 14, and 15, the interior walls 66 and 68, the bottom floor 44, the one or more horizontal structures 72, the ceiling 46, and the generally flat portions of the roof 16 includes a plurality of corner sections (as described above). Also, each of the interior rooms is defined by portions of walls (e.g., 12, 13, 14, 15, 66, 68), portions of a floor (e.g., 44), portions of a ceiling (e.g., 46), and/or portions of a horizontal structure (e.g., 72) intermediate the floor and ceiling. Each such wall portion, floor portion, ceiling portion, and horizontal structure portion also includes a plurality of corner sections within the room. As used herein, a corner section of a room refers to an intersection of three of the dividing structures (e.g., floor, ceiling, walls, horizontal structures) that define the contours of the room. Preferably, the passive ventilation system of the building 64 includes vents (wall-vents, floor-vents, ceiling-floor vents, ceiling-vents, and/or roof-vents) in the corner sections of the exterior walls 12, 13, 14, and 15, the floor 44, the ceiling 46, and the roof fields 18 and 20 of the roof 16, as well as in the corner sections of the material layers that define the contours of the interior rooms of the building.

Each of the exterior walls 12, 13, 14, and 15 of the exterior wall structure 11 has a plurality of corner sections. Preferably, at least one of the exterior walls includes wall-vents 24 in at least half of the corner sections of that particular exterior wall. In another embodiment, each of the exterior walls includes wall-vents 24 in at least half of the corner sections thereof. In another embodiment, each of the exterior walls includes wall-vents 24 in all of the corner sections thereof. It is believed that passive ventilation through the exterior walls and of the entire building 64 will improve as the number of wall-vents 24 in corner sections of the exterior walls increases. In the illustrated embodiments, each exterior wall has four corner sections, preferably with wall-vents 24 in at least two of the corner sections thereof. In the embodiment depicted in FIGS. 9 and 10, each of the exterior walls 12, 13, 14, and 15 includes wall-vents 24 in all four of its corner sections. It will be understood that each exterior wall can have any number of corner sections, depending upon its shape and the design of the building 64.

Like the building 10 shown in FIG. 2, the roof 16 of the building 64 of FIGS. 9 and 10 includes two generally flat roof fields 18 and 20 joined together at an upper ridge 22. Skilled artisans will understand that the roof 16 could include different numbers of generally flat roof fields, depending upon the design of the building 64. Each of the roof fields (e.g., 18 and 20) has a plurality of corner sections. Preferably, at least one of the roof fields includes roof-vents 26 in at least half of the corner sections thereof. In another embodiment, each of the roof fields (e.g., 18 and 20) includes roof-vents 26 in at least half of the corner sections thereof. In another embodiment, each of the roof fields (e.g., 18 and 20) includes roof-vents 26 in all of the corner sections thereof. It is believed that passive ventilation through the roof 16 and of the entire building 64 will improve as the number of roof-vents 26 in corner sections of the roof fields increases. In the illustrated embodiments, each roof field 18 and 20 has four corner sections, preferably with roof-vents 26 in at least two of the corner sections thereof. In the embodiment depicted in FIGS. 9 and 10, each roof field 18 and 20 includes roof-vents 26 in all four of its corner sections. It will be understood that each roof field can have any number of corner sections, depending upon its shape and the design of the building 64. It will also be understood that, while portions of the roof 16 may overhang the exterior walls of the building 64, the roof-vents 26 in corner sections of the roof field (e.g., 18 and 20) are distanced far enough from the edges of the roof so as to provide ventilation with the attic space 52.

With continued reference to FIGS. 9 and 10, the exterior wall structure 11, floor 44, interior walls (e.g., 66 and 68), ceiling 46, and horizontal structures 72 define a plurality of rooms of the building (e.g., the rooms 74, 76, 78, 80, 82, and 84). Generally, each room is defined at its top by a ceiling portion (e.g., ceiling portions 90 and 92 of rooms 82 and 84, respectively) comprising at least a portion of either the ceiling 46 or one of the horizontal structures 72. The ceiling portion of each room has a plurality of corner sections. Preferably, the ceiling portion of at least one of the rooms has either ceiling-vents 50 or ceiling-floor vents 94 (depending upon whether the ceiling portion is part of the ceiling 46 or a horizontal structure 72) in at least half of the corner sections of that ceiling portion. In another embodiment, the ceiling portion of at least one of the rooms has ceiling-vents 50 or ceiling-floor vents 94 (vents 50 and 94 are collectively referred to in this paragraph as "ceiling-vents" for simplicity) in all of the corner sections of that ceiling portion. In another embodiment, a majority of the rooms have ceiling-vents in at least half of the corner sections of the ceiling portion of the room. In another embodiment, a majority of the rooms have ceiling-vents in all of the corner sections of the ceiling portion of the room. In another embodiment, each of the rooms has ceiling-vents in all of the corner sections of the ceiling portion of the room. It is believed that passive ventilation through the rooms' ceiling portions and of the entire building 64 will improve as the number of ceiling-vents in corner sections of the rooms' ceiling portions increases. In the illustrated embodiments, each room is generally rectangular and thus each room's ceiling portion has four corner sections, preferably with vents 50 or 94 in at least two of the corner sections thereof. In the embodiment depicted in FIGS. 9 and 10, each room's ceiling portion includes vents 50 or 94 in all four of its corner sections. It will be understood that a room's ceiling portion can have any number of corner sections, depending upon its shape and the design of the building 64.

With continued reference to FIGS. 9 and 10, each room of the building 64 is defined at its bottom by a floor portion (e.g., floor portions 86 and 88 of rooms 74 and 76, respectively) comprising at least a portion of either the bottom floor 44 or one of the horizontal structures 72. The floor portion of each room has a plurality of corner sections. Preferably, the floor portion of at least one of the rooms has either floor-vents 64 or ceiling-floor vents 94 (depending upon whether the floor portion is part of the floor 44 or a horizontal structure 72) in at least half of the corner sections of that floor portion. In another embodiment, the floor portion of at least one of the rooms has floor-vents 64 or ceiling-floor vents 94 (vents 64 and 94 are collectively referred to in this paragraph as "floor-vents" for simplicity) in all of the corner sections of that floor portion. In another embodiment, a majority of the rooms have floor-vents in at least half of the corner sections of the floor portion of the room. In another embodiment, a majority of the rooms have floor-vents in all of the corner sections of the floor portion of the room. In another embodiment, each of the rooms has floor-vents in all of the corner sections of the floor portion of the room. It is believed that passive ventilation through the rooms' floor portions and of the entire building 64 will improve as the number of vents 64 or 94 in corner sections of the floor portions increases. In the illustrated embodiments, each room is generally rectangular and thus each room's floor portion has four corner sections, preferably with vents 64 or 94 in at least two of the corner sections thereof. In the embodiment depicted in FIGS. 9 and 10, each room's floor portion includes vents 64 or 94 in all four of its corner sections. It will be understood that a room's floor portion can have any number of corner sections, depending upon its shape and the design of the building 64. It will also be understood that floor-vents 64 may be omitted from the bottom floor 44 if the bottom floor is not elevated above the foundation 48 to create an airspace 60 therebetween.

With continued reference to FIGS. 9 and 10, each room of the building 64 is defined at its sides by a plurality of wall portions. Each wall portion of a room comprises at least a portion of one of the exterior walls (e.g., 12, 13, 14, 15) or interior walls (e.g., 66, 68). Each wall portion of a room includes a plurality of corner sections. Preferably, at least one of the wall portions of at least one of the rooms has wall-vents 24 or 70 (depending upon whether the wall portion forms a portion of the exterior wall structure 11 or one of the interior walls of the building) in at least half of the corner sections of that wall portion. In another embodiment, each of the wall portions of at least one of the rooms has wall-vents 24 or 70 in at least half of the corner sections of that wall portion. In another embodiment, each of the wall portions of at least one of the rooms has wall-vents 24 or 70 in all of the corner sections of that wall portion. In another embodiment, each of the wall portions of a majority of the rooms has wall-vents 24 or 70 in at least half of the corner sections thereof. In another embodiment, each of the wall portions of a majority of the rooms has wall-vents 24 or 70 in all of the corner sections thereof. In another embodiment, each of the wall portions of each of the rooms has wall-vents 24 or 70 in all of the corner sections thereof. It is believed that passive ventilation through the rooms' wall portions and of the entire building 64 will improve as the number of wall-vents 24 or 70 in corner sections of the wall portions increases. In the illustrated embodiment, each room is generally rectangular and thus each room's wall portions have four corner sections. In the embodiment depicted in FIGS. 9 and 10, each room's wall portion includes wall-vents 24 or 70 in all four of its corner sections. It will be understood that a wall portion of a room can have any number of corner sections, depending upon its shape and the design of the building 64.

Figure 11:
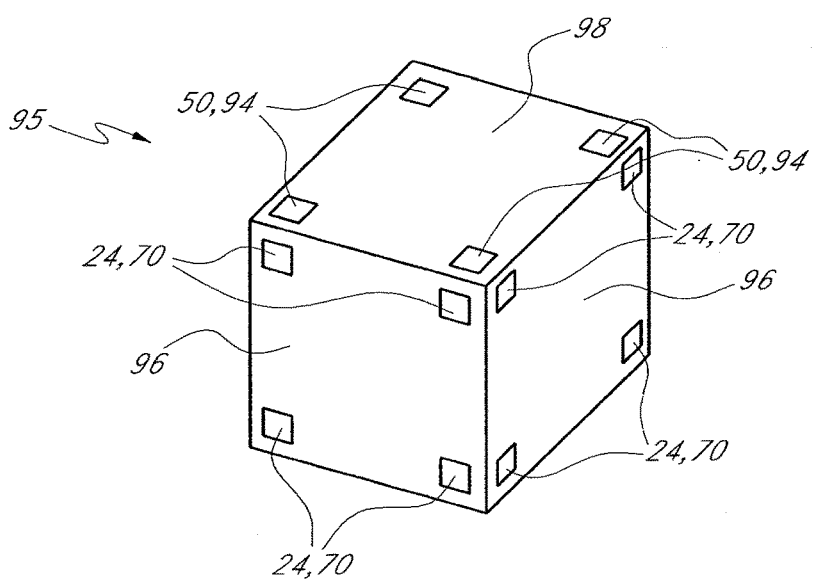
FIG. 11 is a perspective view of a representation of an internal room of a building with a system of vents according to one embodiment.

FIG. 11 is a representational view of a room 95 of a building according to one embodiment. The illustrated 95 room is rectangular, but those of skill in the art will understand that a room can have a wide variety of different shapes and sizes, depending upon the design of the room and the building. The illustrated room 95 includes wall portions 96 that may comprise portions of the exterior wall structure of the building (e.g., walls 12, 13, 14, or 15 of FIGS. 9 and 10) or portions of interior walls (e.g., walls 66 or 68 of FIGS. 9 and 10). The wall portions 96 preferably include wall-vents 24 or 70 in the corner sections thereof. The illustrated room 95 also includes a ceiling portion 98, which may comprise a portion of a building ceiling (e.g., ceiling 46 of FIG. 9) or a portion of a horizontal structure (e.g., horizontal structure 72 of FIG. 9). The ceiling portion 98 preferably includes ceiling-vents 50 or ceiling-floor vents 94 in the corner sections thereof. Although not shown, skilled artisans will understand that the illustrated room 95 also includes a floor portion at its bottom, which may comprise a portion of a bottom floor of the building (e.g., bottom floor 44 in FIG. 9) or a portion of a horizontal structure (e.g., horizontal structure 72 of FIG. 9). The floor portion preferably includes floor-vents or ceiling-floor vents 94 in the corner sections thereof.

It will be understood that the degree of passive ventilation within a building of the embodiments described herein can be affected by controlling the number and sizes of the various vents described above. It can also be affected by controlling the positioning of the vents. For example, the ventilation can be improved by generally vertically aligning two or more of the floor-vents, ceiling-vents, and ceiling-floor vents. Vertical alignment of the vents promotes substantially vertical airflow paths through multiple stories of the building. Each vertical flow of air through a room draws air from the airspace laterally displaced from the vertical flow paths. Preferably, the roof-vents 26, ceiling-vents 50, ceiling-floor vents 94, and floor-vents 64 (or combinations thereof) are aligned substantially vertically throughout a substantial portion of the height of the building (or more preferably throughout substantially the entire height of the building) at one or more horizontal positions of the building, to thereby produce one or more substantially vertical flows of air upward and out through the ceiling and/or roof of the building, without the use of ventilation stacks.

Figure 12:
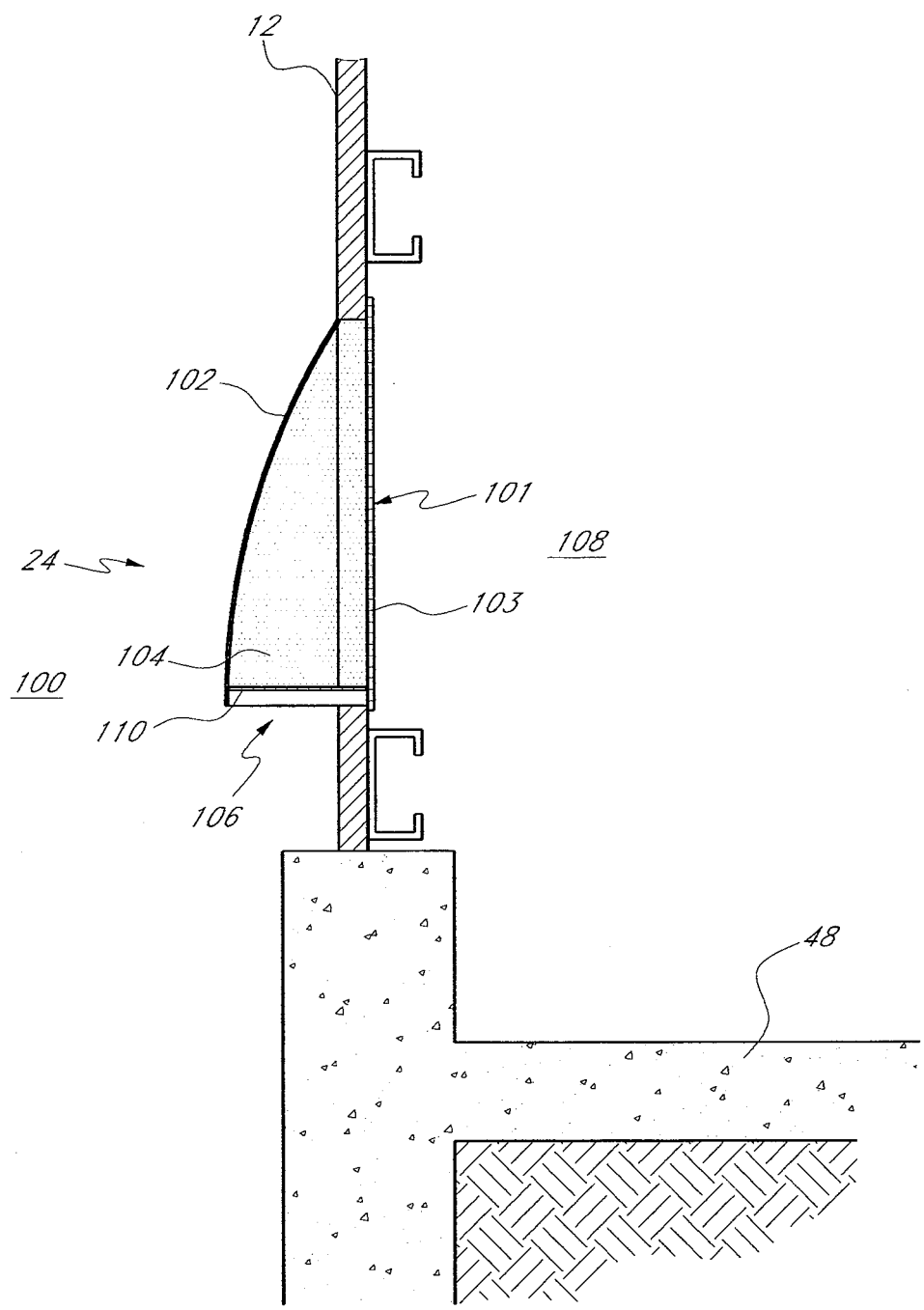
FIG. 12 is a cross-sectional side view of an exterior static wall-vent filter shown in FIG. 5.

FIG. 12 shows a wall-vent 24 for use in an exterior wall 12 of a building, according to one embodiment of the invention. In the illustrated embodiment, the exterior wall 12 is formed on a foundation 48 and includes an opening 101 within which the wall-vent 24 is positioned. The wall-vent 24 permits airflow between a building exterior 100 and a building interior 108. The illustrated wall-vent 24 includes an outwardly depending skirt 102, forming an opening 106 at its bottom end. A screen or other type of filtering apparatus 103 may be provided at the interior opening 101 of the wall 12. Likewise, a screen or other type of filtering apparatus 110 may be provided at the opening 106 of the skirt 102. Preferably, a filter 104 is provided at the interior of the skirt 102 so that air must flow through the filter 104 if it is to flow between the building exterior 100 and the building interior 108. The filter 104 may comprise spun plastic, metallic mesh (preferably with openings no greater than ¼ inch), plastic screen, mosquito fine netting (perhaps on chicken wire support), or like materials. The filter 104 can optionally include a louvered cover configured to be completely opened or closed. Preferably, the wall-vent 24 is configured to prevent the ingress of one or more of a variety of different substances and life forms, such as vermin, insects, water, leaves, dust, etc. It will be understood that the roof-vents 26, floor-vents 64, and underfloor-vents 62 can also include filters for preventing the ingress of various substances and life forms.

With respect to all of the vents described above, it will be understood that there are a wide variety of different types of vents that can be used. For example, the roof-vents 26 can be translucent to allow sunlight to enter the home. On tile-roofs, the roof-vents 26 can be configured to visually blend in with the tiles. It is believed that the principles of the present invention apply regardless of the specific types of vents employed. Preferably, the roof-vents 26, ceiling-vents 50, and ceiling-floor vents 94 are dividing-structure vents, as described herein. Preferably, the floor-vents 64 are also dividing-structure vents.

Figure 13:
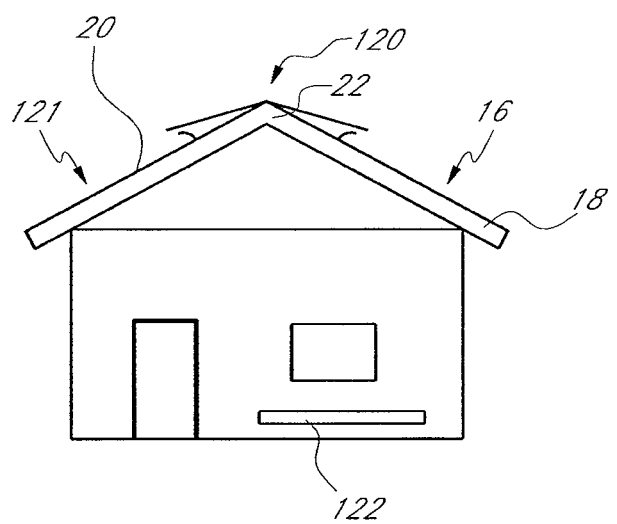
FIG. 13 is a front view of a building with a ridgeline roof-vent according to one embodiment, along with one or more elongated wall vents.

As mentioned above, the degree of passive ventilation can be adjusted by varying the sizes of the various vents. One way to do that is to provide elongated vents, which leads to more air flow. FIG. 13 shows a building 121 having an elongated roof-vent and one or more elongated wall vents 122. The illustrated roof-vent comprises a roof ridge line vent 120 that extends along a desired length of the ridge 22 of the roof 16. This roof ridge line vent 120 also provides reduced risk of water leakage compared to conventional roof-vents. It will be understood that other types of elongated roof-vents can also be used. In addition to the roof-vent 120 and wall vent 122, other vents can also be elongated, such as wall vents on the other exterior walls and/or the interior walls, floor vents, ceiling vents, ceiling-floor vents, and/or other roof-vents. It is believed that elongated vents may be preferred in tropical climates, in which temperature variations are relatively small. Elongated vents might be less desirable in cooler climates, in which it is desirable to reduce heat loss from the building. In one embodiment, the elongated wall vents 122 include filters, such as the filter 104 (FIG. 12) described above. In one embodiment, the filter comprises mosquito netting supported on chicken wire, which is relatively inexpensive. In one embodiment, the wall vent 122 is about 4-15 inches in vertical height and 6-30 inches in length.

With continuing reference to FIG. 13, the illustrated roof-vent 120 comprises a roof ridgeline vent that extends along a desired length of the ridge 22 of the roof 16, and which provides reduced risk of water leakage compared to conventional roof-vents. Since the roof-vent 120 is elongated along at least a portion of the roof's ridge 22, the vent 120 provides for generally increased ventilation. It is believed that the elongated roof ridgeline vent 120 may be preferred in tropical climates, in which temperature variations are relatively small and where there is less concern over reducing heat loss from the building. The roof ridgeline vent 120 can be provided in buildings having attics as well as buildings with vaulted ceilings and no attics. Other embodiments of roof ridgeline vents are described in detail in U.S. Pat. No. 7,250,000, the entire disclosure of which is hereby incorporated herein by reference.

Passive Ventilation Control System

Figure 15:
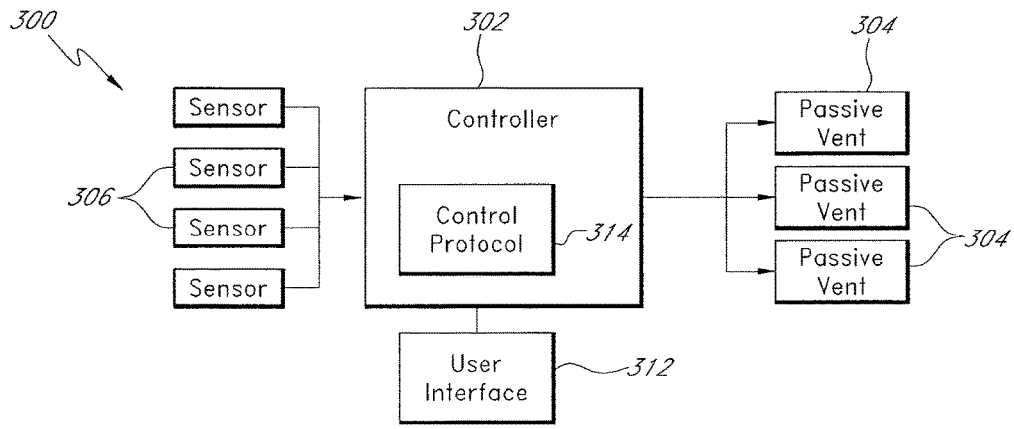
FIG. 15 is a schematic of a control system for controlling a plurality of passive vents based on measured aspects of a building's atmosphere, in accordance with one embodiment.

FIG. 15 is a schematic of a passive ventilation control system 300 for controlling a plurality of passive vents based on measured aspects of a building's atmosphere, in accordance with an embodiment. It will be understood that the passive ventilation control system 300 may be used to control any type of passive vent 304, including, but not limited to, the aforementioned roof-vents, ceiling-vents, and wall-vents. The control system 300 includes a controller 302, a plurality of passive vents 304, a plurality of sensors 306, and, optionally, a user interface 313. While FIG. 15 shows four sensors 306 and three vents 304, skilled artisans will understand that any number of sensors 306 and vents 304 can be provided.

The sensors 306 are configured to measure aspects or conditions of a building's atmosphere. The skilled artisan will readily appreciate that multiple sensors can be provided for measuring the same aspect in different portions of the building. Sensors can also be provided for measuring atmospheric conditions outside of the building. The sensors 306 can be configured to sense a variety of different atmospheric qualities, such as, without limitation, (1) the absolute pressure in the building, (2) the pressure differential between the building's interior and exterior, (3) the temperature in the building, (4) the temperature differential between the building's interior and exterior, (5) the humidity in the building, (6) the humidity differential between the building's interior and exterior, (7) rates of airflow through one or more of the passive vents 304, (8) the rate of air changes in the building, (9) a concentration of particulate matter in the building interior, and (10) outdoor precipitation. Alternative and/or additional atmospheric qualities can also be sensed by the sensors 306 and used by the controller 302 for controlling the passive vents 304, as described in more detail below.

The rate of air changes in the building refers to the amount of times the air in the building is substantially completely replaced by new air, per unit time. For example, the air in a building can change 20 times per hour. Those of ordinary skill in the art will understand that the rate of air changes varies with the number of vents 304 and their "flow areas." As used herein, a vent's "flow area" means the size of the opening of the vent. In the vents 304 of the invention, the flow area is preferably adjustable. The rate of air changes also depends on the size and design of the building.

The concentration of particulate matter can refer to a variety of different types of particles in the interior air of the building. For example, it can refer to the concentration of smoke, pollen, dust, and other materials, as well as the total of such different materials simultaneously in the air (or the total of any subcombination thereof).

Many known types of sensors can be used for the sensors 306. For example, barometers can be used to measure pressure. Thermometers or pyrometers can be used to measure temperature. Hygrometers can be used to measure humidity. Other types of sensors not identified herein can also or alternatively be used.

The passive vents 304 are preferably dividing-structure vents, such as, without limitation, wall-vents, floor-vents, ceiling-vents, ceiling-floor vents, roof-vents, and under-floor-vents. The vents 304 have adjustable flow areas and are preferably configured to be electrically adjusted by the controller 302. Preferably, the vents 304 comprise multiple sets or groups of vents, wherein the vents of each set are substantially vertically aligned so as to promote a substantially vertical flow of air through the vents of that set. For example, a set of vents 304 may comprise ceiling-floor vents, a ceiling-vent, and a roof-vent that are vertically aligned and positioned in corner sections of ceiling-floors, a ceiling, and a roof.

Figure 16:
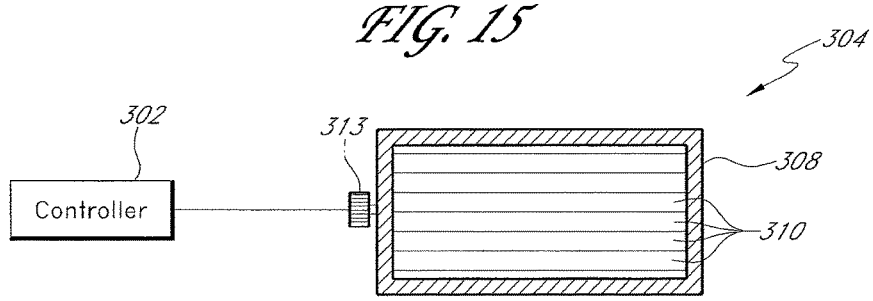
FIG. 16 is a schematic of an electromechanically adjustable passive vent.

FIG. 16 shows one example of a passive vent 304 that can be used as a dividing-structure vent in a floor, roof, wall, ceiling, ceiling-floor, and the like. Skilled artisans will appreciate that other types of vents can be used instead. The illustrated vent 304 comprises a frame or passageway 308, through which air flows in a direction generally perpendicular to the plane of the figure. A plurality of louvers 310 is provided within the passageway 308. Each of the louvers 310 is preferably mounted so as to rotate about an axis extending through the louver and perpendicular to the general direction of airflow. Preferably, the louvers 310 are substantially parallel to one another. The louvers 310 have a closed position in which they substantially completely block airflow through the passageway 308, and in which the vent has substantially zero flow area. The louvers 310 also have an open position in which they permit comparatively free airflow through the passageway 308, characterized by a maximum flow area of the vent. In addition, the louvers 310 are able to occupy positions between the open and closed positions, in which the flow area through the vent 304 is between zero and the maximum. In FIG. 16, the louvers 310 are shown in their closed position. The vent 304 has a control interface 313, schematically illustrated as a rotatable knob. The knob 313 is preferably electrically controllable and configured to effect a simultaneous and uniform rotation of the louvers 310 between their open and closed positions. The controller 302 is preferably configured to adjust the flow area of the vent 304 (by adjusting the position of the louvers 310) via the control interface 313. The skilled artisan will understand that the control interface 313 may comprise a servo motor for electrically adjusting the knob 313 in the illustrated embodiment.

Figure 17:
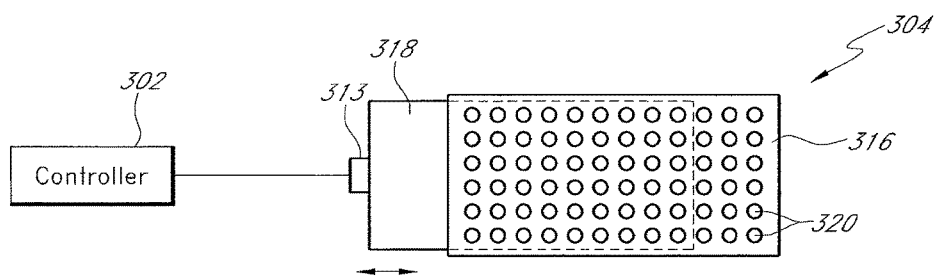
FIG. 17 is a schematic of another type of electromechanically adjustable passive vent.

FIG. 17 shows another example of a passive vent 304 that can be used as a dividing-structure vent in a floor, roof, wall, ceiling, ceiling-floor, and the like. The vent 304 includes a perforated plate 316 and an adjacent sliding plate 318. The perforated plate 316 is positioned within an airflow passage and oriented generally perpendicular to the flow of air, which in the illustrated embodiment is generally perpendicular to the plane of the figure. The illustrated plate 316 includes a plurality of rows and columns of substantially identical circular openings 320. However, those of ordinary skill in the art will recognize that the openings 320 can have a wide variety of different shapes, sizes, and arrangements. Also, the sizes and shapes of the openings 320 can differ from one another. The sliding plate 318 is immediately adjacent to the perforated plate 316, so that the plate 318 can substantially block airflow through some or all of the openings 320. The sliding plate 318 is configured to translate back and forth in one direction between a closed position and an open position. In the closed position, the plate 318 substantially blocks airflow through all of the openings 320, corresponding to a zero flow area of the vent 304. In FIG. 17, the sliding plate 318 occupies its closed position when it slides all the way to the right. In the open position, the plate 318 permits free airflow through each of the openings 320, corresponding to a maximum flow area of the vent 304 (the flow area equaling the combined area of all of the openings 320). In FIG. 17, the plate 318 occupies its open position when it slides all the way to the left. FIG. 17 shows the plate 318 in a position between its open and closed positions. In the illustrated position, airflow is permitted through three columns of openings 320. Suitable seals and/or lubricants may be provided between the plates 316 and 318.

It will be understood that the flow area of the vent 304 can be adjusted by moving the sliding plate 318, it being possible to partially block one or more openings 320. The vent 304 has a control interface 313, schematically illustrated as a small rectangle on one end of the plate 318. The back and forth translation of the plate 318 is preferably electrically controllable via the control interface 313. The controller 302 is preferably configured to adjust position of the plate 318 via the control interface 313, thereby permitting electrical control over the flow area of the vent 304.

With reference again to FIG. 15, the controller 302 is preferably configured to receive electronic measurement signals from the sensors 306 and automatically adjust flow areas of the vents 304 in response to the signals. The signals convey the measured atmospheric conditions. The signals can be transmitted wirelessly (e.g., radio frequency, infrared, etc.) or via wires. The controller 302 can be positioned at any convenient location within the building, such as a garage of a residential house.

In the illustrated embodiment, the controller 302 includes a preferably programmable control-protocol 314 that includes information used by the controller 302 to adjust the flow areas of the vents 304. The control-protocol 314 preferably comprises two portions: (1) targeted indoor atmospheric conditions and (2) rules used by the controller 302 to determine ideal flow areas for each vent in order to achieve the targeted conditions. The targeted conditions may comprise temperature (e.g., 71° F.), temperature differential between indoor/outdoor, pressure, pressure differential between indoor/outdoor, humidity (e.g., less than 50%), humidity differential between indoor/outdoor, rate of air changes of the building (e.g., 20 air changes per hour), concentration of particulate matter, and the like.

The rules portion of the control-protocol 314 can comprise multiple-variable equations developed empirically through experimentation. Alternatively, the rules portion can be formed based on theory. Skilled artisans will appreciate that some aspects of the invention are independent of the specific formulae and rules of the rules portion of the control-protocol 314. Variables of the equations may include the sensor readings, the building size and geometry, the number of vents 304, the positions of the vents 304, etc.

With reference to FIG. 15, a user interface 313 can be provided to permit users to monitor and/or control the system 300. For instance, the user interface 313 can be configured to allow users to monitor the readings of the sensors 306 and the flow areas of the vents 304. The user interface 313 can also be configured to allow users to program the control-protocol 314 of the controller 302. The user interface 313 can additionally be configured to allow users to directly control the flow areas of the vents 304, in effect overriding the controller 302. In some embodiments, the user interface 313 is integrated with the controller 302 so that they are provided in a single housing. In other embodiments, the user interface 313 is separate and perhaps remotely located from the controller 302. The user interface 313 (or the combination of the user interface and the controller 302) can comprise a computer, such as a common home computer system. The controller 302 and/or user interface 313 can comprise hardware, software, firmware, or a combination thereof. Multiple user interfaces 313 can be provided, such as one user interface integrated with the controller 302 and one or more user interfaces located remotely therefrom. A user interface 313 can be provided within a wireless handheld device, such as a cell phone or personal digital assistant.

FIG. 18 illustrates an exploded perspective view of an embodiment of a passive roof-vent 150 that may be controlled by a passive ventilation control system 300 (FIG. 15). The illustrated roof-vent 150 is positioned within a roof field (e.g., 18, 20 in FIGS. 2-5). In this embodiment, the roof fields are preferably covered by so-called composition shingles or roofing material 152. According to this embodiment, the roof 16 has a roof deck 154, which may include a sheathing and an underlay material overlying the sheathing. Typically, the sheathing comprises plywood and the underlay material comprises tar. The composition shingles 152 are mounted on the underlay material. The roof-vent 150 preferably includes a vent cover 156a, a vent base member 156b, a vent door 158, and an actuator 160. As used herein, the vent cover 156a and the vent base member 156b may be collectively referred to as a "vent member." In certain embodiments, a vent cover and a vent base member may be integrated with each other, forming a single vent member. It will be appreciated that a plurality of roof-vents can be provided in one roof. It will also be appreciated that a roof-vent can be provided in other types of roofs, such as tile roofs, sheet metal roofs, etc.

As shown in FIG. 18, the vent base member 156b is configured to be secured at an aperture 162 in the roof deck 154 of the roof 16. The vent base member 156b is preferably mounted on the roof deck 154 (either on the sheathing or on the underlay material). The illustrated vent base member 156b includes an opening 164 in its central portion. Although the illustrated opening 164 is square, the skilled artisan will appreciate that it can have any shape so long as the vent door 158 is sufficiently sized and shaped to cover the opening 164. The opening 164 permits airflow between regions above and below the roof 16. As noted above, the regions below the roof 16 may include an attic space 52 or a living space (e.g., room 95 of FIG. 11) of a building. The opening 164 may be covered by a screen 164a to prevent entry of insects, vermin, and debris larger than the screen openings. The vent base member 156b may also include one or more upstanding baffle walls that prevent ingress of water into the opening 164.

In the illustrated embodiment, the vent cover 156a is mounted over the vent base member 156b. The vent cover 156a is preferably configured to protrude slightly above the level of the top surfaces of the shingles 152. The vent cover 156a includes an opening 166 in its central portion. As shown in FIG. 18, the opening 166 in the vent cover 156a is in fluid communication with the opening 164 of the vent base member 156b as well as the aperture 162 of the roof deck 154. Preferably the openings 166, 164 and the aperture 162 have substantially the same size and shape. In addition, the vent cover 156a preferably has a downwardly depending baffle or flange 156c at its lower edge. The flange 156c is preferably configured to allow airflow underneath it to the aperture 162 in the roof deck 154 while preventing ingress of rain or snow, as shown in FIGS. 19A and 19B.

The illustrated vent cover 156a also comprises louvers 168. The louvers 168 include a number of narrow slits 168a, 168b formed in parallel to each other. The slits 168a, 168b are in fluid communication with the regions below the roof 16, and further facilitate airflow between the regions above and below the roof 16. It will be appreciated that the shape and position of the slits can be varied, depending on the design of the vent base member. Skilled artisans will also understand that the louvers 168 can be omitted or replaced with other types of openings. In the illustrated embodiment, the louvers 168 allow relatively less airflow through the vent 150 compared with the opening 166, which is configured to allow more airflow therethrough than the louvers 168. Preferably, ventilation airflow requirements (such as, in the U.S., Net Free Vent Area (NFVA) statutes) are satisfied by the louvers 168 and front openings under the flange 156c. It will be appreciated that the opening 166 of the vent cover 156a provides additional ventilation.

The vent door 158 is preferably operatively connected to the vent cover 156a to move between an open position and a closed position. The vent door 158 is preferably over the opening 166 in the vent cover 156a, serving as a cap for the opening 166. At the open position (illustrated), the vent door 158 permits airflow through the opening 166, whereas the vent door 158 substantially prevents airflow through the opening 166 in the closed position (not shown). As shown in FIG. 18, in the illustrated embodiment, the vent door 158 rotatably pivots between the open and closed positions.

In the illustrated embodiment, the actuator 160 is configured to move the vent door 158 between the open and closed positions, preferably based on ambient temperature. In a preferred embodiment, the actuator 160 includes a bimetallic strip or a bimetal motor, which moves in reaction to the ambient temperature. For example, the bimetallic strip or the bimetal motor is preferably configured to automatically open the vent door 158 when the ambient temperature is above a predetermined level and the bimetallic strip or bimetal motor preferably closes the vent door 158 when the temperature is below the predetermined level. In certain embodiments, the actuator 160 may include a shape-memory alloy (SMA), instead of a bimetallic strip or bimetal motor. The SMA also preferably moves in reaction to the ambient temperature. Details of a shape-memory alloy are disclosed in L. M. Schetcky, "Shape-memory alloy," Scientific American, 241

(November 1979), the entire disclosure of which is hereby incorporated herein by reference. The skilled artisan will appreciate that various configurations of bimetallic strips, bimetal motors, or shape-memory alloys can be adapted to move the vent door 158.

FIGS. 19A and 19B illustrate the open and closed positions, respectively, of the vent door 158. When the ambient temperature is above a predetermined temperature, the actuator 160 opens the vent door 158, as shown in FIG. 19A. On the other hand, when the ambient temperature is below the predetermined temperature, the actuator 160 closes the vent door 158, as shown in FIG. 19B. In another embodiment, the actuator 160 comprises a bimetallic strip or SMA that has varied degrees of deformation in a predetermined range of temperature. Such an actuator may control the degree of opening of the vent door 158 based on the ambient temperature. It will be understood that the roof-vent 150 can also be controlled by the control system 300 (FIG. 15) based on other atmospheric conditions or environmental parameters in addition to temperature.

Figure 20:
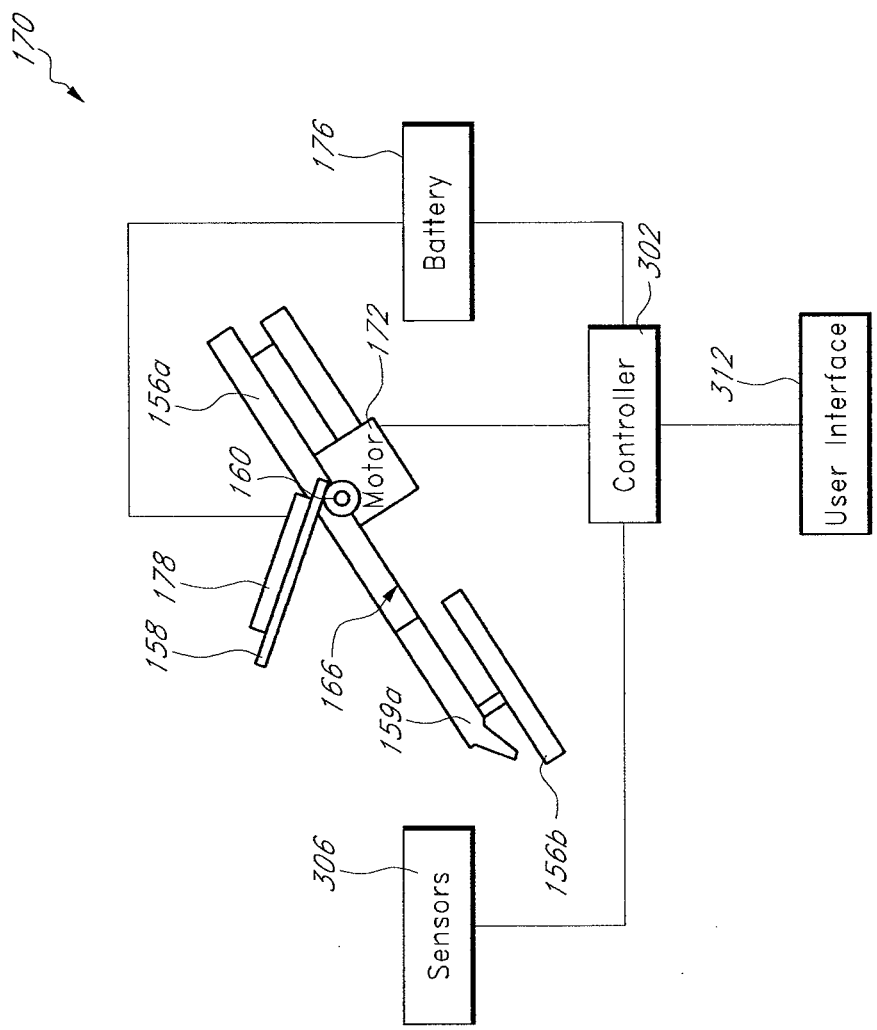
FIG. 20 is a schematic cross-sectional view of an adjustable roof vent system in accordance with another embodiment.

FIG. 20 schematically illustrates another embodiment of a roof-vent 170, which is operable based on environmental parameters and can be controlled by the control system 300 (FIG. 15). The roof-vent 170 preferably includes a vent cover 156a, a vent base member 156b, a vent door 158, a servo motor 172, a controller 302, a battery 176, a solar panel 178, one or more sensors 306, and a user interface 312. Configurations of the vent cover 156a, the vent base member 156b, and the vent door 158 are preferably as described above with respect to FIGS. 18 and 19. It will be appreciated that a plurality of roof-vents 170 can be provided in one roof, preferably in the corners sections as described above. Skilled artisans will also appreciate that a plurality of roof-vents 170 can share a common battery 176, controller 302, sensors 306, and/or user interface 312.

In the illustrated embodiment, the servo motor 172 is configured to adjust the actuator 160 to move the vent door 158 between open and closed positions. It will be understood that, in this embodiment, the actuator 160 serves as the control interface 313 (FIGS. 15-17). The illustrated servo motor 172 is connected to the actuator 160 at an edge of the vent door 158. In its open position, the vent door 158 allows substantially unimpeded airflow through an opening 166 in the vent cover 156a. In its closed position, the vent door 158 substantially prevents airflow through the opening 166. The servo motor 172 and actuator 160 preferably provide for pivoted rotational movement of the vent door 158 between its open and closed positions. In an alternative embodiment, a linear actuator may be used to lift the vent door 158 from the vent cover 156a to allow airflow through an opening 166 in the vent cover 156a. The skilled artisan will appreciate that different types of mechanisms can be employed to move the vent door 158 between open and closed positions.

The controller 302 is preferably configured to drive the servo motor 172 (or other mechanism). The controller 302 is electrically connected to the servo motor 172. As will be later described, the controller 302 is preferably configured to drive the servo motor 172 based on at least one environmental parameter. The controller 302 preferably also has the ability to control the precise position of the vent door 158 (i.e., the degree to which the vent door 158 is open), as opposed to just fully opening or fully closing the door 158. Thus, the controller 302 is preferably capable of finely controlling the size of the ventilation pathway through the vent. The controller 302 preferably includes a CPU or microprocessor, a memory device, and other peripheral components to collect, process, store, and transmit electronic data.

The battery 176 is configured to supply power to the controller 302 and/or the servo motor 172. The battery 176 is electrically connected to the controller 302. The battery 176 preferably serves as a main power source for the controller 302. In certain embodiments, an additional or auxiliary power source (not shown) may be provided to (and may even be the sole source of power for) the controller 302. An exemplary additional power source is a domestic AC power source (e.g., from a municipal power grid). The domestic power source may be directly connected to the controller 302. In other embodiments, the domestic power source may be connected to the battery 176 to charge the battery 176 in case the solar panel 178 is not functional.

The solar panel 178 is optional and is preferably configured to convert solar energy into electricity, and to supply the electricity to the battery 176 for storage. In the illustrated embodiment, the solar panel 178 is electrically connected to the battery 176. In certain embodiments, the solar panel 178 may be indirectly connected to the battery 176 via the controller 302. The solar panel 178 is configured to be positioned on the roof in a location such that the solar panel receives solar radiation. The illustrated solar panel 178 is mounted on the vent door 158. In other embodiments, the solar panel may be positioned at any other suitable site on the roof. Preferably, the site is where the solar panel can effectively collect solar radiation. It will be appreciated that more than one solar panel can be associated with each vent 170.

The one or more sensors 306 are configured to collect at least one environmental parameter on which the controller 302 operation is preferably based. Examples of environmental parameters include, but are not limited to, temperature, temperatures differentials, humidity, humidity differentials, precipitation, moisture, toxicity, airflow, ambient light level, pressure, and pressure differentials. The sensors 306 are preferably configured to measure environmental parameters and convert the parameters into electronic data. Preferably, each of the sensors 306 has means for measuring a respective environmental parameter. In addition, each of the sensors may further include a microprocessor, a memory, and peripheral components to collect, process, store, and transmit data to the controller 302.

Examples of sensors include, but are not limited to, a temperature sensor (e.g., thermocouple or pyrometer), a humidity sensor, a precipitation sensor, a moisture sensor, a toxicity sensor, an air flow sensor, an ambient light level sensor, and a pressure sensor. In certain embodiments, two or more of the sensors may be combined to provide measurements of multiple environmental parameters. The sensors 306 are preferably all electrically connected to or adapted to communicate with the controller 302. The sensors 306 may be powered by the battery 176 via the controller 302 or by another power source.

The user interface 312 is preferably configured to displays measurements of the at least one environmental parameter collected from the sensors 306. The user interface 312 may also be configured to allow a user to control the servo motor 172 via the controller 302. The user interface 312 preferably includes a display device, such as an LCD or CRT screen. Optionally, the user interface 312 may include an input device such as a touch pad screen and/or push buttons. In certain embodiments, the input device may be a key board or key pad. The user interface 312 is preferably electrically connected to or adapted to communicate with the controller 302. In another embodiment, the user interface 312 may communicate with the controller 302 wirelessly, and thus permits wireless control of the motor 172. In certain embodiments, the user interface 312 and the controller 302 may be integrated into one device.

Figure 22:
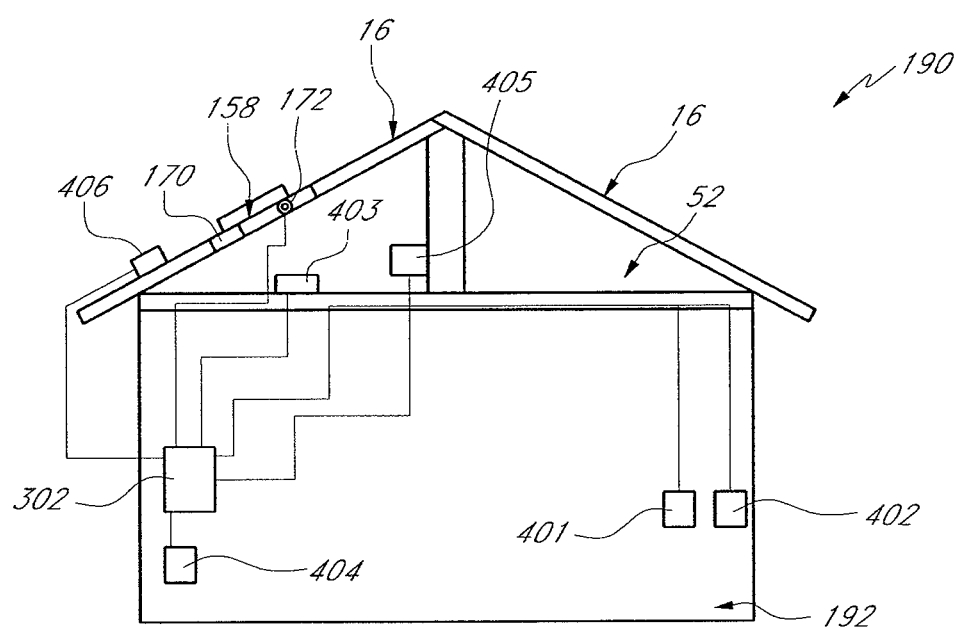
FIG. 22 is a schematic cross-sectional view of an embodiment of the roof vent system of Fig. 20, which shows sensor locations.

FIG. 22 illustrates the positions of the sensors of FIG. 20 in a building 190 according to one embodiment. The building 190 includes a roof 16, a living space 192, and an attic space 52 between the roof 16 and the living space 192. The building 190 preferably includes a variety of sensors that are connected to a controller 302 for adjusting the roof-vents 170 in the building 190. In the illustrated embodiment, a temperature sensor 401 is positioned in the living space 192. In addition, a humidity sensor 402 and a toxicity sensor 404 are also positioned in the living space 192 at a suitable level and location. An airflow sensor 403 is positioned in the attic 52 to monitor airflow near a roof-vent 170. A moisture sensor 405 is also positioned in the attic 52 to monitor moisture level in the attic 52. A precipitation sensor 406 is preferably mounted on the roof 16 to monitor precipitation. In other embodiments, the sensors may be positioned at different locations. In addition, two or more sensors of the same type may be provided at several different locations. The skilled artisan will readily appreciate that any of a wide variety of different combinations and types of sensors can be provided.

In one embodiment, a roof-ventilation system includes a plurality of roof-vents in a roof. Each of the roof-vents is configured to automatically adjust its ventilation pathway size based on at least one environmental condition. For example, each of the vents can include a vent base member, a vent cover, and an actuator, such as shown in FIG. 18. The vent base member includes an opening, and is configured to be secured at an aperture in the roof so that the opening permits airflow through the aperture and the opening between regions above and below the roof. The vent cover is secured to the vent base member and has a vent door that has an open position and a closed position. In the open position, the vent door permits airflow through the opening, whereas in the closed position, the vent door substantially prevents airflow through the opening. The actuator is configured to move the vent door between the open and closed positions based on the environmental conditions. The actuator is also preferably capable of finely controlling the position of the vent door. Thus, the size of ventilation pathway through the vent can be finely controlled. In one embodiment, the actuator may include a bimetallic strip, bimetal motor, or SMA as described above.

In certain embodiments, the actuator includes a servo motor, instead of the bimetallic strip or motor. The system may also include one or more solar panels, one or more batteries, and one or more controllers. The configuration of each of the vents may be as described above with respect to FIGS. 20 and 22. The controllers may adjust various vent covers differently or uniformly, based on different or the same environmental conditions, to achieve a targeted result.

Figure 21:
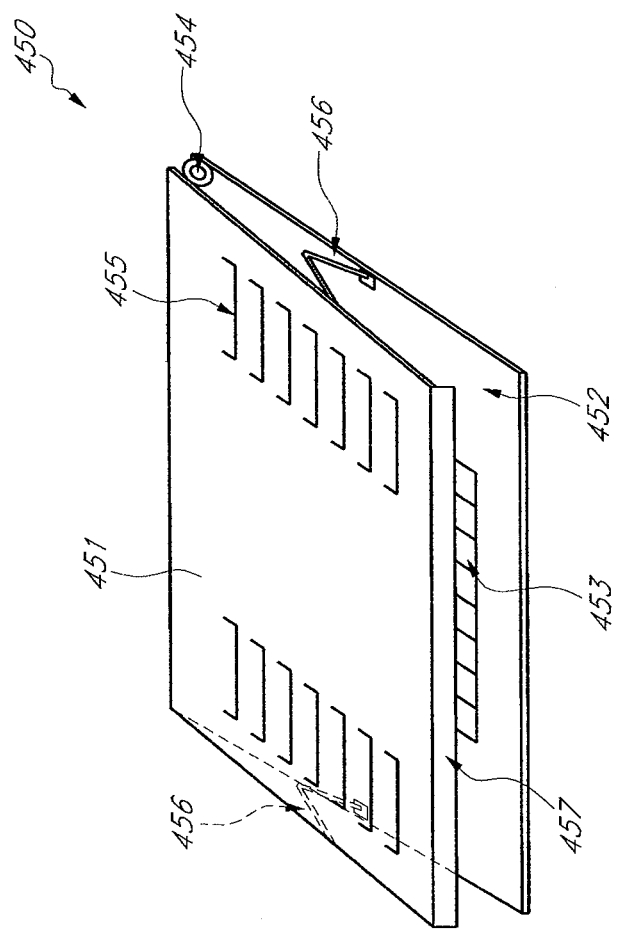
FIG. 21 is a schematic cross-sectional view of an adjustable roof-vent in accordance with another embodiment.

FIG. 21 illustrates another embodiment of a roof-vent 450. The roof-vent 450 preferably includes a vent cover 451, a vent base member 452, a hinge 454, and an actuator 456. According to this embodiment, the vent base member 452 is configured to be secured at an aperture in a roof deck of a roof (not shown). The illustrated vent base member 452 includes an opening 453 penetrating its central portion. The opening 453 permits airflow between regions above and below the roof. The illustrated opening 453 is covered by a screen to prevent entry of insects, vermin, and debris larger than the screen openings. The vent base member 452 may also include one or more upstanding baffle walls (e.g., around the perimeter of the opening 453) that prevent ingress of water into the opening 453.

The vent cover 451 is hingedly connected to the vent base member 452 via the hinge 454. The vent cover 451 is configured to pivotally move between open and closed positions. The vent cover 451 includes louvers 455 as described above with respect to the roof-vent 150 of FIG. 18. The vent cover 451 has a baffle or flange 457 at its lower edge. The flange 457 may be configured to allow airflow underneath it to the aperture in the roof deck at the closed position of the vent cover 451, while preventing ingress of rain or snow. This configuration always maintains a minimum degree of openness of the roof-vent 450 (to, e.g., satisfy statutory ventilation requirements, such as U.S. "Net Free Vent Area" statutes). In another embodiment, the flange 457 may be configured to completely close ventilation, except, perhaps, through the louvers 455.

The actuator 456 is configured to move the vent cover 451 between the open and closed positions, based on environmental parameters. Preferably, the actuator 456 is positioned in front of the hinge 454, and is attached to a side edge portion of the vent cover 451 adjacent to the flange 457. This configuration effectively moves the vent cover 451, which is of a larger size than the vent door 158 of FIG. 18. In other embodiments, various other configurations of actuators may be employed. In one embodiment, the actuator 456 may include a bimetallic strip, bimetal motor, or SMA as described above. In another embodiment, the actuator 456 may be a servo motor as described above. In the latter embodiment, the roof-vent 450 may also include a controller, a battery, a solar panel, one or more sensors and a user interface as described above with respect to FIG. 20.

Other types or configurations of roof-vents may be suitable for being adapted to possess aspects of the present invention. Examples of such roof-vents, without limitation, are shown and disclosed in U.S. Pat. Nos. 6,050,039; 6,129,628; 6,447,390; and U.S. Design Pat. No. Des 549, 316, the full disclosure of which are hereby incorporated herein by reference.

The illustrated embodiments show roof-vents with movable doors or covers for controlling airflow through the vent. While louvers or a front opening can be provided in addition to the opening occluded by the movable door or cover, some embodiments omit all openings except the one associated with the movable door or cover, such that the total airflow through the vent is controlled completely by the movable door or cover.

The vents, vent arrangements, and roof of the various embodiments of the present invention are preferably employed in a building that does not include any forced ventilation ducts or apparatus. Preferably, the only ventilation apparatus of the building is the passive ventilation apparatus described herein, plus equivalents thereof. The buildings of the invention are preferably configured only for passive ventilation. The skilled artisan will understand that various combinations of the passive vents described herein, such as roof-vents, floor-vents, ceiling vents, ceiling-floor vents, etc., can be provided in a building and can be substantially vertically aligned and/or positioned in corner sections. These passive vents can include the electromechanically adjustable vents described with reference to FIGS. 15-22.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications thereof. Thus, it is intended that the scope of the present invention herein disclosed should not be limited by the particular disclosed embodiments described above, but should be determined only by a fair reading of the claims that follow.

What is claimed is:

1. A roof field vent comprising:
a vent member having at least a portion configured to be installed on a roof deck of a roof, the vent member separate from the roof deck and including a first opening and a second opening, said portion of the vent member configured to be secured at an aperture extending through a thickness of the roof deck so that air can flow along a first flow path through the aperture and the first opening or along a second flow path through the aperture and the second opening, each of the first and second flow paths extending between an exterior region above the roof and an interior region below the roof, the interior region at least partially bounded by the roof deck;
a vent door operatively connected to the vent member, the vent door having an open position in which the vent door permits airflow along the first flow path and through the first opening and a closed position in which the vent door substantially prevents airflow along the first flow path and through the first opening; and
an actuator configured to move the vent door between the open and closed positions based on ambient temperature;
wherein the vent member, when said portion is secured at the aperture in the roof deck, is configured to conduct airflow along the second flow path through the aperture and the second opening between the exterior region above the roof and the interior region below the roof regardless of the position of the vent door and ambient temperature.

2. The roof field vent of claim 1, wherein the actuator comprises a bimetallic strip.

3. The roof field vent of claim 1, wherein the actuator comprises a bimetal motor.

4. The roof field vent of claim 1, wherein the second opening comprises a plurality of louvers configured to facilitate at least a portion of the airflow along the second flow path conducted by the vent member between the exterior region above the roof and the interior region below the roof regardless of the position of the vent door.

5. The roof field vent of claim 1, wherein the vent member comprises a vent base member and a vent cover configured to reside over the vent base member; and wherein the first opening comprises
a vent base opening in the vent base member and configured to be in fluid communication with the aperture in the roof deck when the vent base member is secured to the roof deck; and
a vent cover opening in the vent cover and in fluid communication with the vent base member opening; and
wherein the vent door is operatively connected to the vent cover.

6. The roof field vent of claim 5 wherein the second opening comprises a plurality of louvers on the vent cover configured to facilitate at least a portion of the airflow along the second flow path conducted by the vent member between the exterior region above the roof and the interior region below the roof regardless of the position of the vent door and ambient temperature.

7. The roof field vent of claim 5 wherein the second opening comprises a gap between eave-facing edges of the vent cover and the vent base member, the gap configured to facilitate at least a portion of the airflow along the second flow path conducted by the vent member between the regions above and below the roof regardless of the position of the vent door and ambient temperature.

8. The roof field vent of claim 5 wherein the vent base member and the vent cover are configured to be oriented generally along a planar portion of the roof deck.

9. The roof field vent of claim 1, wherein the vent door is configured to cover substantially an entire top surface of the vent member in the closed position.

10. The roof field vent of claim 1, wherein the actuator comprises a shape memory alloy.

11. The roof field vent of claim 1 wherein the vent member is configured to be oriented generally along a planar portion of the roof deck.

12. The roof field vent of claim 1, wherein a lower surface of the vent member is installed on an upper surface of the roof deck.

13. A roof field vent comprising:
a vent member having at least a portion configured to be installed on a roof deck of a roof, the vent member including a first opening and a second opening, said portion of the vent member configured to be secured over an aperture in the roof deck so that air can flow along a first flow path through the aperture and the first opening or along a second flow path, through the aperture and the second opening, wherein each of the first and second flow paths extend between an exterior region above the roof and an interior region below the roof, the interior region at least partially bounded by the roof deck;
a single vent door operatively connected to the vent member, the vent door having an open position in which the vent door permits airflow along the first flow path and through the first opening and a closed position in which the vent door substantially prevents airflow along the first flow path and through the first opening; and
an actuator configured to move the vent door between the open and closed positions based on ambient temperature;
wherein the vent member, when said portion is secured over the aperture in the roof deck, is configured to conduct airflow along the second flow path through the aperture and the second opening between the exterior region above the roof and the interior region below the roof regardless of the position of the single vent door and ambient temperature.

14. A roof field vent comprising:
a vent member having at least a portion configured to be installed on a roof deck of a roof, the vent member including a first opening, said portion of the vent member configured to be secured at an aperture in the roof deck so that air can flow along a first flow path extending through both the aperture and the first opening, between an exterior region above the roof and an interior region below the roof, the interior region at least partially bounded by the roof deck;
a vent door operatively connected to the vent member, the vent door having an open position in which the vent door permits airflow along the first flow path, and a closed position in which the vent door substantially prevents airflow along the first flow path; and an actuator configured to move the vent door between the open and closed positions based on ambient temperature;

wherein the vent member, when said portion is secured at the aperture in the roof deck, is configured to conduct airflow along a second flow path extending from the interior region below the roof, through the aperture, along a bottom surface of the vent member, and through a second opening in the vent member to the exterior region above the roof, regardless of the position of the vent door and ambient temperature.

\* \* \* \* \*